US012300166B2

(12) United States Patent
Wu et al.

(10) Patent No.: US 12,300,166 B2
(45) Date of Patent: May 13, 2025

(54) DISPLAY PANEL AND DISPLAY DEVICE HAVING MULTIPLE SIGNAL BUS LINES FOR MULTIPLE INITIALIZATION SIGNALS

(71) Applicants: Chengdu BOE Optoelectronics Technology Co., Ltd., Chengdu (CN); BOE TECHNOLOGY GROUP CO., LTD., Beijing (CN)

(72) Inventors: Chao Wu, Beijing (CN); Yue Long, Beijing (CN); Jianchang Cai, Beijing (CN); Yuanyou Qiu, Beijing (CN); Kaipeng Sun, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/910,960

(22) PCT Filed: Sep. 8, 2021

(86) PCT No.: PCT/CN2021/117133

§ 371 (c)(1),
(2) Date: Sep. 12, 2022

(87) PCT Pub. No.: WO2023/035138

PCT Pub. Date: Mar. 16, 2023

(65) Prior Publication Data

US 2024/0282259 A1 Aug. 22, 2024

(51) Int. Cl.
*G09G 3/3233* (2016.01)

(52) U.S. Cl.
CPC ... *G09G 3/3233* (2013.01); *G09G 2300/0426* (2013.01); *G09G 2310/08* (2013.01); *G09G 2320/0233* (2013.01); *G09G 2360/14* (2013.01)

(58) Field of Classification Search
CPC ......... G09G 3/3233; G09G 2300/0426; G09G 2310/08; G09G 2320/0233;
(Continued)

(56) References Cited

U.S. PATENT DOCUMENTS 11,308,852 B2 4/2022 Xiong et al.
11,430,388 B2 8/2022 Wang et al.
(Continued)

FOREIGN PATENT DOCUMENTS

CN 106782270 A 5/2017
CN 109215582 A 1/2019
(Continued)

OTHER PUBLICATIONS

International Search Report in PCT/CN2021/117133 dated Mar. 30, 2022 in English.

(Continued)

*Primary Examiner* — Richard J Hong
(74) *Attorney, Agent, or Firm* — Collard & Roe, P.C.; William Collard

(57) ABSTRACT

A display panel and a display device are provided. The display panel includes: a pixel unit, including a pixel circuit and a light-emitting element, the pixel circuit including a driving transistor, a first reset transistor, and a second reset transistor; the pixel unit including a first pixel unit and a second pixel unit; a first initialization signal line is connected with a first electrode of the first reset transistor in the first pixel unit; a second initialization signal line is connected with a first electrode of the second reset transistor in the first pixel unit; a third initialization signal line is connected with a first electrode of the first reset transistor in the second pixel unit; a fourth initialization signal line is connected with a first electrode of the second reset transistor in the second pixel unit; the first to third initialization signal (Continued)

lines are connected with a first signal bus line, respectively; a second signal bus line is connected with the fourth initialization signal line, the first signal bus line and the second signal bus line are insulated from each other.

19 Claims, 18 Drawing Sheets

(58) Field of Classification Search
CPC ............. G09G 2360/14; G09G 3/3225; G09G 3/3258; G09G 3/32; G09G 3/04; G09G 3/3266; G09G 3/325; H10K 59/131; H10K 59/123
See application file for complete search history.

(56) References Cited

U.S. PATENT DOCUMENTS

| | | | | |
|---|---|---|---|---|
| 11,568,800 | B2 | 1/2023 | Yang et al. | |
| 2002/0117750 | A1 | 8/2002 | Kojima et al. | |
| 2018/0308417 | A1* | 10/2018 | Xie | G09G 3/3266 |
| 2019/0114966 | A1* | 4/2019 | Park | G09G 3/2003 |
| 2020/0052048 | A1* | 2/2020 | Kuo | H10K 59/123 |
| 2020/0105187 | A1* | 4/2020 | Bian | G09G 3/325 |
| 2020/0279895 | A1* | 9/2020 | Kuo | G09G 3/3225 |
| 2020/0411610 | A1* | 12/2020 | Zhang | H10K 59/131 |
| 2021/0012706 | A1* | 1/2021 | Yang | G09G 3/32 |
| 2021/0201762 | A1* | 7/2021 | He | H10K 59/123 |
| 2022/0068211 | A1* | 3/2022 | Jeong | H10K 59/131 |
| 2022/0093038 | A1* | 3/2022 | Yang | G09G 3/04 |
| 2022/0101799 | A1* | 3/2022 | Lee | G09G 3/3275 |
| 2022/0109040 | A1* | 4/2022 | Jung | G09G 3/3225 |
| 2022/0208100 | A1* | 6/2022 | Jung | G09G 3/3258 |
| 2022/0285476 | A1 | 9/2022 | Li et al. | |
| 2022/0335866 | A1* | 10/2022 | Lee | G09G 3/3291 |
| 2023/0006016 | A1* | 1/2023 | Jeon | H10K 59/131 |
| 2023/0245622 | A1* | 8/2023 | Jung | G09G 3/3233 345/204 |
| 2023/0292566 | A1* | 9/2023 | Jung | H10K 59/131 |

FOREIGN PATENT DOCUMENTS

| | | | |
|---|---|---|---|
| CN | 111341257 | A | 6/2020 |
| CN | 111564476 | A | 8/2020 |
| CN | 111785761 | A | 10/2020 |
| CN | 112117320 | A | 12/2020 |
| CN | 112700749 | A | 4/2021 |
| CN | 112863428 | A | 5/2021 |
| CN | 112927646 | A | 6/2021 |

OTHER PUBLICATIONS

Written Opinion of the International Search Authority in PCT/CN2021/117133 dated Mar. 30, 2022 in English.

International Search Report in PCT/CN2021/117133 dated Mar. 30, 2022 in Chinese.

Written Opinion in PCT/CN2021/117133 dated Mar. 30, 2022 in Chinese.

* cited by examiner

DISPLAY PANEL AND DISPLAY DEVICE HAVING MULTIPLE SIGNAL BUS LINES FOR MULTIPLE INITIALIZATION SIGNALS

CROSS REFERENCE TO RELATED APPLICATIONS

This patent application is a U.S. National Phase Entry of International Application No. PCT/CN2021/117133 filed on Sep. 8, 2021, the disclosure of which is incorporated herein by reference in its entirety as part of the embodiment of the present disclosure.

TECHNICAL FIELD

At least one embodiment of the present disclosure relates to a display panel and a display device.

BACKGROUND

With the continuous development of display technology, active-matrix organic light-emitting diode (AMOLED) display technology has been more and more used in mobile phones, tablet computers, digital cameras and other display devices due to its advantages such as self-luminescence, wide viewing angle, high contrast, low power consumption, and high response speed, and the like.

An under-screen camera technology is a brand-new technology proposed to increase the screen-to-body ratio of a display device.

SUMMARY

At least one embodiment of the present disclosure relates to a display panel and a display device.

At least one embodiment of the present disclosure provides a display panel, including: a base substrate, including a display region, the display region including a first display region and a second display region, the first display region being located on at least one side of the second display region; a pixel unit, located on the base substrate, including a pixel circuit and a light-emitting element, the pixel circuit being configured to drive the light-emitting element, the pixel circuit including a driving transistor, a first reset transistor, and a second reset transistor, the first reset transistor being connected with a gate electrode of the driving transistor and being configured to reset the gate electrode of the driving transistor, the second reset transistor being connected with a first electrode of the light-emitting element and configured to reset the first electrode of the light-emitting element; the pixel unit including a first pixel unit and a second pixel unit, the pixel circuit of the first pixel unit being located in the first display region, and at least partially overlapping with the light-emitting element of the first pixel unit, the light-emitting element of the second pixel unit being located in the second display region, the pixel circuit of the second pixel unit being located outside the second display region, the pixel circuit of the second pixel unit being connected with the light-emitting element of the second pixel unit through a conductive line; a first initialization signal line, connected with a first electrode of the first reset transistor in the first pixel unit; a second initialization signal line, connected with a first electrode of the second reset transistor in the first pixel unit; a third initialization signal line, connected with a first electrode of the first reset transistor in the second pixel unit; a fourth initialization signal line, connected with a first electrode of the second reset transistor in the second pixel unit; a first signal bus line, configured to supply a first initialization signal, the first initialization signal line, the second initialization signal line, and the third initialization signal line being connected with the first signal bus line, respectively; a second signal bus line, configured to supply a second initialization signal and connected with the fourth initialization signal line; the first signal bus line and the second signal bus line are insulated from each other, so as to be configured to input different initialization signals.

For example, an orthographic projection of the pixel circuit of the second pixel unit on the base substrate do not overlap with an orthographic projection of the light-emitting element of the second pixel unit on the base substrate.

For example, the base substrate further includes a peripheral region, the peripheral region is located on at least one side of the display region, and the peripheral region is a non-display region, and the pixel circuit of the second pixel unit is located in the peripheral region.

For example, at least a part of the first signal bus line and at least a part of the second signal bus line are both located in the peripheral region.

For example, the second initialization signal is greater than the first initialization signal.

For example, the display panel further includes an integrated circuit, the first signal bus line and the second signal bus line are connected with different pins of the integrated circuit, respectively.

For example, the first signal bus line is closer to the display region than the second signal bus line.

For example, the display panel further includes a power supply line, the power supply line is configured to supply a constant voltage signal to the pixel circuit, the power supply line is connected with a second electrode of the light-emitting element, and at least a part of the second signal bus line is located between the power supply line and the display region.

For example, at least a part of the first signal bus line is located between the power supply line and the display region.

For example, the display panel further includes a control circuit, the control circuit is located between the power supply line and the display region, the first signal bus line and the second signal bus line are located between the control circuit and the display region.

For example, the display panel further includes a control circuit, the control circuit is located between the power supply line and the display region, and the first signal bus line is located between the control circuit and the display region, and the second signal bus line is located between the control circuit and the power supply line.

For example, an orthographic projection of the second signal bus line on the base substrate at least partially overlaps with an orthographic projection of the control circuit on the base substrate.

For example, an orthographic projection of the second signal bus line on the base substrate at least partially overlaps with an orthographic projection of the power supply line on the base substrate.

For example, the second signal bus line includes two sub-lines that are located in a first conductive layer and a second conductive layer, respectively, and are connected through a via hole.

For example, the first signal bus line includes two sub-lines that are located in a third conductive layer and a fourth conductive layer, respectively, and are connected through a via hole.

For example, a width of the first signal bus line is greater than a width of the second signal bus line.

For example, the second signal bus line is configured to supply the second initialization signal, and the second initialization signal includes at least two voltage signals with different values.

At least one embodiment of the present disclosure further provides a display device, including any one of the display panels.

For example, the display device further includes a photosensitive sensor, the photosensitive sensor is located on one side of the display panel.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not construed any limitation to the present disclosure.

DETAILED DESCRIPTION

In order to make objectives, technical details, and advantages of the embodiments of the present disclosure more clear, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment (s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the described object is changed, the relative position relationship may be changed accordingly.

With a continuous development of a mobile phone screen, a full-screen mobile phone and an under-screen camera technology have become hot spots. In order to improve a PPI (Pixel Per Inch) and a transmittance of a camera region, an under-screen camera region usually retains a light-emitting element, and a pixel circuit (driving circuit) of the light-emitting element is placed in another position. For example, the pixel circuit can adopt an external-arranging or a compression solution, and usually a transparent conductive line is used to connect the light-emitting element and the pixel circuit to complete driving and light emitting of the light-emitting element.

Figure 1:
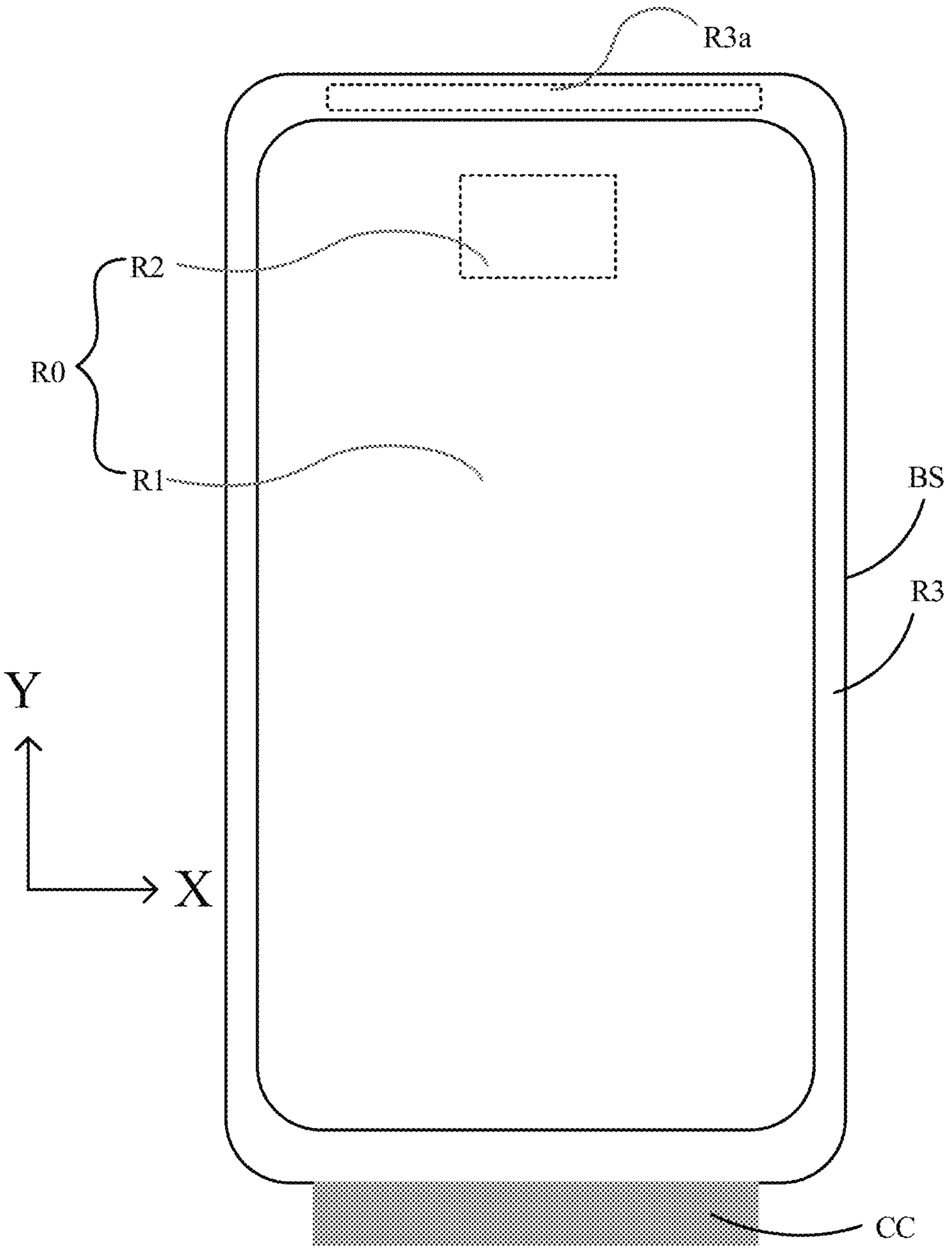
FIG. 1 is a schematic diagram of a display panel.

FIG. 1 is a schematic diagram of a display panel. As illustrated in FIG. 1, the display panel includes a display region R0 and a peripheral region R3. The peripheral region R3 is a non-display region. The display region R0 includes a first display region R1 and a second display region R2. For example, a hardware such as a photosensitive sensor (for example, a camera) is disposed on one side of the display panel at a position corresponding to the second display region R2. For example, the second display region R2 is a light-transmitting display region, and the first display region R1 is a display region. For example, the first display region R1 is opaque and only used for display. The first display region R1 and the second display region R2 together constitute a region of the display panel for displaying an image. FIG. 1 further illustrates a base substrate BS and an integrated circuit CC.

Figure 2:
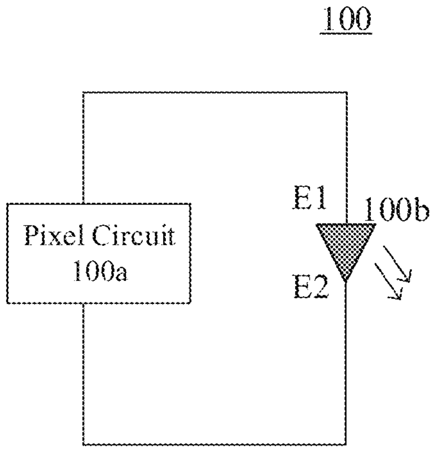
FIG. 2 is a schematic diagram of a pixel unit of a display panel.

FIG. 2 is a schematic diagram of a pixel unit of a display panel. As illustrated in FIG. 2, the pixel unit 100 includes a pixel circuit 100*a* and a light-emitting element 100*b*, and the pixel circuit 100*a* is configured to drive the light-emitting element 100*b*. For example, the pixel circuit 100*a* is configured to provide a driving current to drive the light-emitting element 100*b* to emit light. For example, the light-emitting element 100*b* includes an organic light-emitting diode (OLED), and the light-emitting element 100*b* emits red light, green light, blue light, or white light under driving of its corresponding pixel circuit 100*a*. A light-emitting color of the light-emitting element 100*b* can be determined according to needs. As illustrated in FIG. 2, the light-emitting element 100*b* includes a first electrode E1, a second electrode E2, and a light-emitting functional layer located between the first electrode E1 and the second electrode E2. For example, the first electrode E1 is an anode, and the second electrode E2 is a cathode, but not limited thereto. For example, the first electrode E1 may be a pixel electrode, and the second electrode E2 may be a common electrode.

In order to increase a light transmittance of the second display region R2, it is possible to only dispose the light-emitting elements in the second display region R2, and the pixel circuits for driving the light-emitting elements of the second display region R2 may be disposed outside the second display region R2. For example, the pixel circuits driving the light-emitting elements of the second display region R2 are disposed in the first display region R1 or the peripheral region R3. That is, the light transmittance of the second display region R2 is improved by the way that the light-emitting elements and the pixel circuits are separately disposed. That is, no pixel circuit is disposed in the second display region R2.

Figure 3:
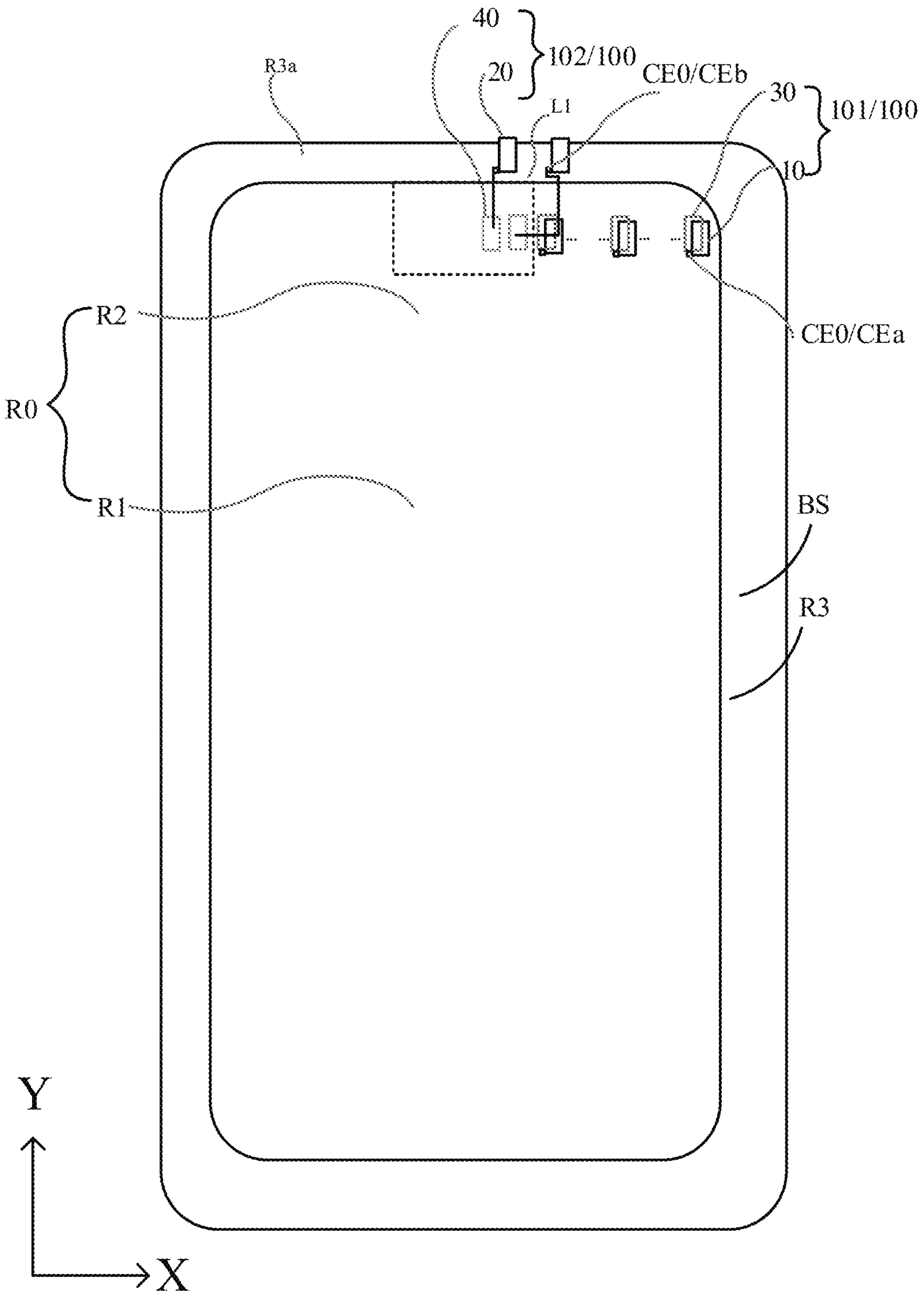
FIG. 3 is a schematic diagram of a display panel with pixel circuit external-arranged.

FIG. 3 is a schematic diagram of the display panel with pixel circuits external-arranged. As illustrated in FIG. 3, the display panel includes: a base substrate BS and a pixel unit 100 disposed on the base substrate BS. As illustrated in FIG. 3, the pixel unit 100 includes a first pixel unit 101 and a second pixel unit 102, the first pixel unit 101 includes a first pixel circuit 10 and a first light-emitting element 30, and the second pixel unit 102 includes a second pixel circuit 20 and a second light-emitting element 40. As illustrated in FIG. 3, the first pixel circuit 10 and the first light-emitting element 30 of the first pixel unit 101 are disposed in the first display region R1, the second pixel circuit 20 of the second pixel unit 102 is disposed in the peripheral region R3, and the second light-emitting element 40 of the second pixel unit 102 is disposed in the second display region R2. For example, the first pixel circuit 10 may be referred to as an in-situ pixel circuit, and the second pixel circuit 20 may be referred to as an ex-situ pixel circuit. Both the first pixel circuit 10 and the second pixel circuit 20 are driving circuits. As illustrated in FIG. 1, in the second display region R2, a light-transmitting sub-region is located between adjacent second light-emitting elements 40, and the region where the second light-emitting element 40 is disposed is a display sub-region. FIG. 1 and FIG. 3 illustrate an external circuit region R3*a*. For example, as illustrated in FIG. 3, the second pixel circuit 20 is disposed in the external circuit region R3*a*.

For example, as illustrated in FIG. 3, the display panel includes a plurality of first pixel circuits 10 and a plurality of first light-emitting elements 30 disposed in the first display region R1, a plurality of second pixel circuits 20 disposed in the peripheral region R3, and a plurality of second light-emitting elements 40 disposed in the second display region R2. For example, as illustrated in FIG. 3, the plurality of second pixel circuits 20 may be arranged in the peripheral region R3 in an array manner.

For example, as illustrated in FIG. 3, at least one first pixel circuit 10 of the plurality of first pixel circuits 10 is connected with at least one first light-emitting element 30 of the plurality of first light-emitting elements 30, and an orthographic projection of the at least one first pixel circuit 10 on the base substrate BS may at least partially overlap with an orthographic projection of the at least one first light-emitting element 30 on the base substrate BS. The at least one first pixel circuit 10 can be used to provide a driving signal for the first light-emitting element 30 connected with the first pixel circuit 10 to drive the first light-emitting element 30 to emit light.

FIG. 3 is described with reference to the case where the second pixel circuit 20 driving the second light-emitting element 40 to emit light is located in the peripheral region R3, by way of example, the second pixel circuit 20 is disposed outside the display region R0, and in this case, the display panel adopts a pixel circuit external-arranged solution. Of course, in other embodiments, the second pixel circuit 20 may also be disposed in the first display region R1, thereby forming a pixel circuit compression solution. In the pixel circuit compression solution, a size of the pixel circuit in the first direction X is reduced, so that the first pixel circuit 10 and the second pixel circuit 20 can be disposed in the first direction X, and the second pixel circuits 20 can be dispersedly arranged in the first pixel circuits 10. For example, the first direction X is a row direction, and in a same row of pixel circuits, the second pixel circuits 20 are arranged in the first pixel circuits 10 at intervals.

For example, as illustrated in FIG. 1 and FIG. 3, the first display region R1 may be disposed on at least one side of the second display region R2. For example, in some embodiments, the first display region R1 surrounds the second display region R2. That is, the second display region R2 may be surrounded by the first display region R1. The second display region R2 can also be arranged at other positions, and an arrangement position of the second display region R2 can be determined according to needs. For example, the second display region R2 may be disposed at a top middle position of the base substrate BS, or may be disposed at an upper left corner or an upper right corner of the base substrate BS.

Figure 4:
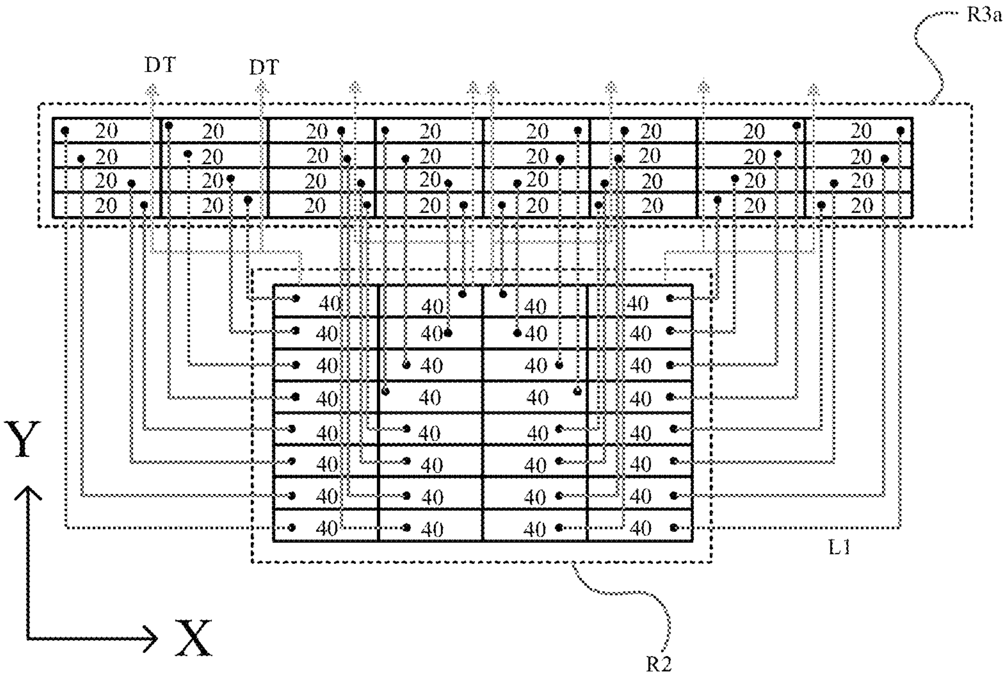
FIG. 4 is a schematic connection diagram of a pixel circuit and a light-emitting element of a second pixel unit in a display panel provided by an embodiment of the present disclosure.

FIG. 4 is a schematic diagram of a connection of a second pixel circuit and a second light-emitting element in the display panel provided by an embodiment of the present disclosure. For example, as illustrated in FIG. 3 and FIG. 4, at least one second pixel circuit 20 of the plurality of second pixel circuits 20 may be connected with at least one second light-emitting element 40 of the plurality of second light-emitting elements 40 through a conductive line L1, and the at least one second pixel circuit 20 can be used to provide a driving signal for the second light-emitting element 40 connected with the second pixel circuit 20 to drive the second light-emitting element 40 to emit light. The second pixel circuit 20 controls the second light-emitting element 40 to emit light through the conductive line L1.

As illustrated in FIG. 3 and FIG. 4, the second light-emitting element 40 is located in the second display region R2, the second pixel circuit 20 is located in the peripheral region R3, because the second light-emitting element 40 and the second pixel circuit 20 are located in different regions, there is no overlapping portion between an orthographic projection of the at least one second pixel circuit 20 on the base substrate BS and an orthographic projection of the at least one second light-emitting element 40 on the base substrate BS.

For example, in the embodiments of the present disclosure, the first display region R1 can be set to be an opaque display region, and the second display region R2 can be set to be a light-transmitting display region. For example, the first display region R1 cannot transmit light, and the second display region R2 can transmit light. In this way, a hole-forming processing does not need to be performed on the display panel provided by the embodiment of the present disclosure, and required hardware structure such as a photosensitive sensor can be directly arranged at a position corresponding to the second display region R2 on one side of the display panel, which lays a solid foundation for a realization of a true full screen. In addition, because the second display region R2 only includes light-emitting elements and does not include pixel circuits, it is beneficial to increasing the light transmittance of the second display region R2, so that the display panel has a better display effect.

For example, as illustrated in FIG. 3 and FIG. 4, the second pixel circuit 20 and the second light-emitting element 40 of the second pixel unit 102 are arranged separately, and the arrangement of the conductive line L1 is illustrated in FIG. 4. FIG. 4 is described with reference to the case where one second pixel circuit 20 is connected with one second light-emitting element 40, by way of example. As illustrated in FIG. 4, the plurality of second pixel circuits 20 are arranged in an array, and FIG. 4 is described with reference to the case where one column of second light-emitting elements 40 corresponds to two columns of second pixel circuits 20, by way of example. FIG. 4 further illustrates a data line DT.

As illustrated in FIG. 3 and FIG. 4, the pixel circuit (the second pixel circuit 20) of the second pixel unit 102 is connected with the light-emitting element (the second light-emitting element 40) of the second pixel unit 102 through the conductive line L1. For example, the conductive line L1 is made of a transparent conductive material. For example, the conductive line L1 is made of conductive oxide material. For example, the conductive oxide material includes indium tin oxide (ITO), but is not limited thereto.

As illustrated in FIG. 3 and FIG. 4, one end of the conductive line L1 is connected with the second pixel circuit 20, and the other end of the conductive line L1 is connected with the second light-emitting element 40. As illustrated in FIG. 3 and FIG. 4, the conductive line L1 extends from the first display region R1 to the second display region R2.

Figure 5:
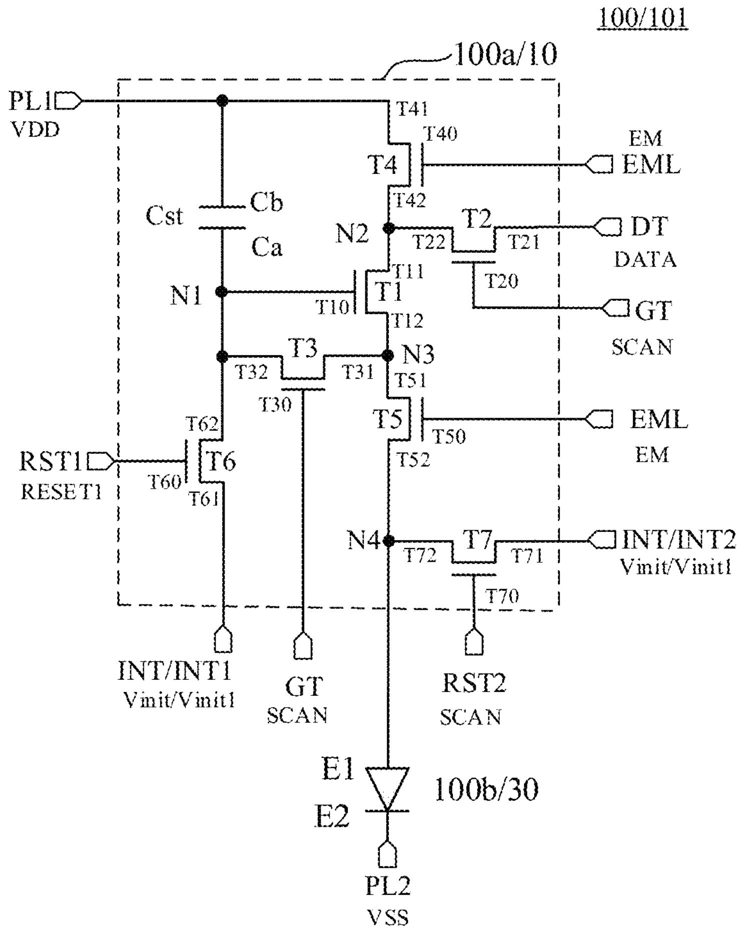
FIG. 5 is a schematic diagram of a pixel circuit in a display panel provided by an embodiment of the present disclosure.
Figure 6:
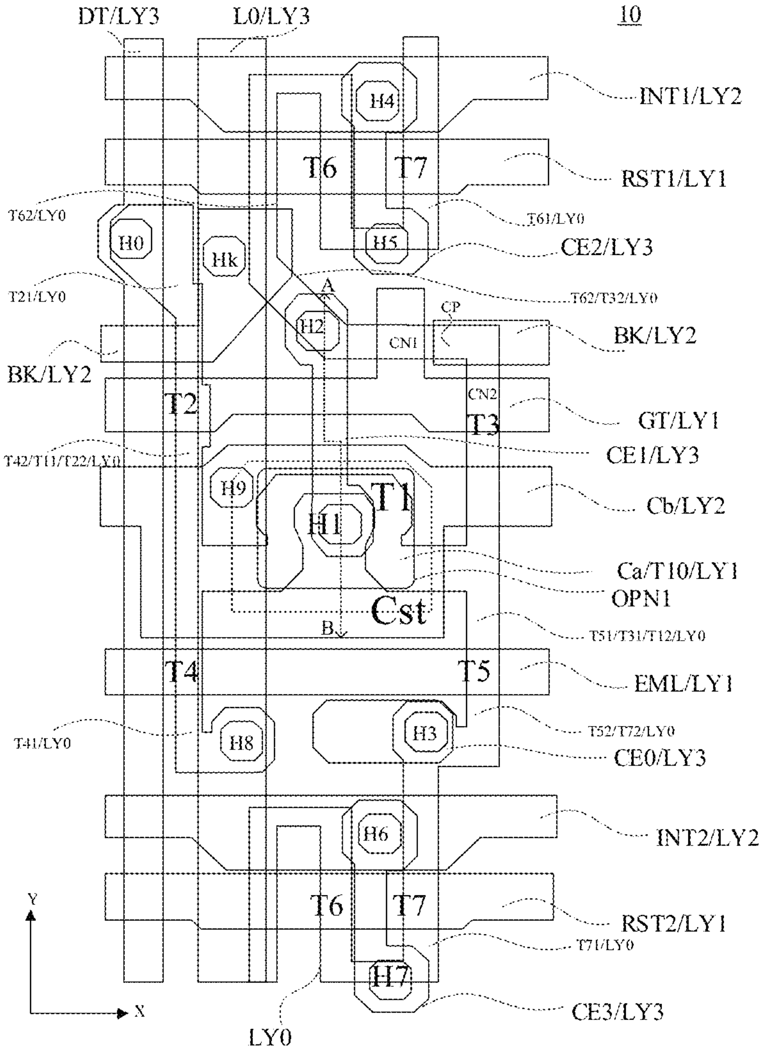
FIG. 6 is a layout diagram of the pixel circuit in the display panel provided by an embodiment of the present disclosure.
Figure 7:
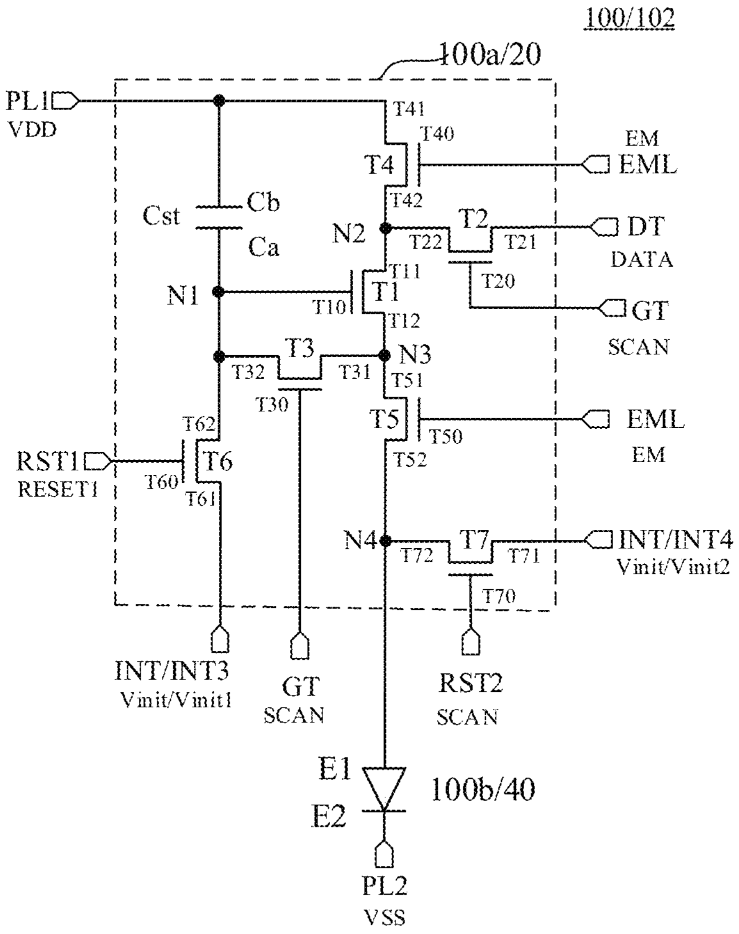
FIG. 7 is a schematic diagram of the pixel circuit in the display panel provided by an embodiment of the present disclosure.
Figure 8:
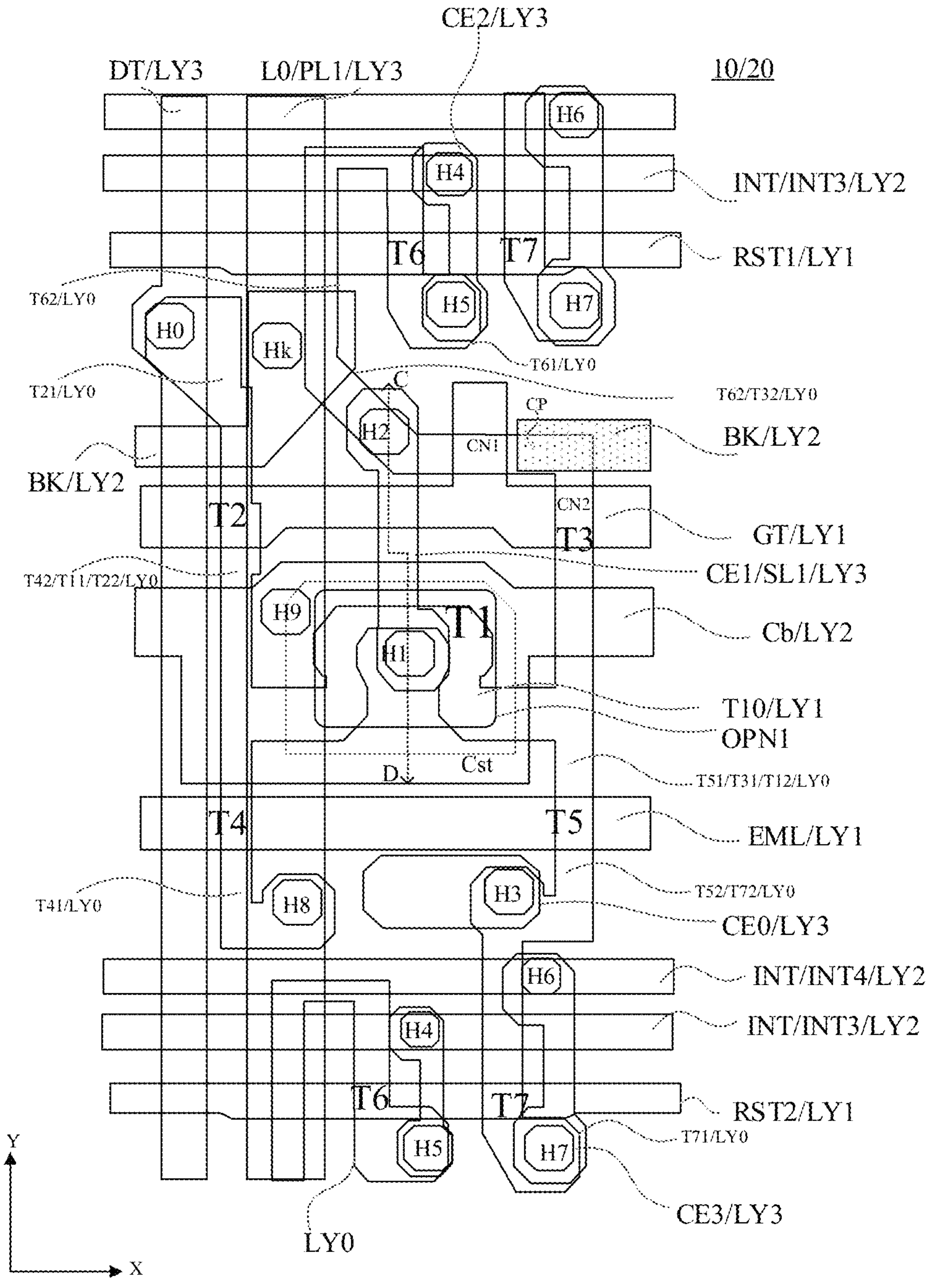
FIG. 8 is a layout diagram of the pixel circuit in the display panel provided by an embodiment of the present disclosure.
Figure 9:
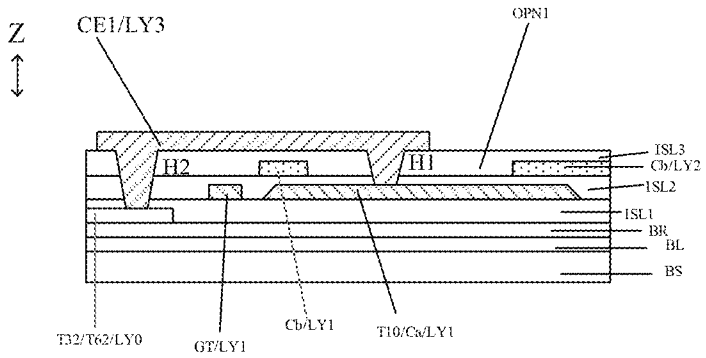
FIG. 9 is a cross-sectional view taken along line A-B of FIG. 6 or a cross-sectional view taken along line C-D of FIG. 8.
Figure 10:
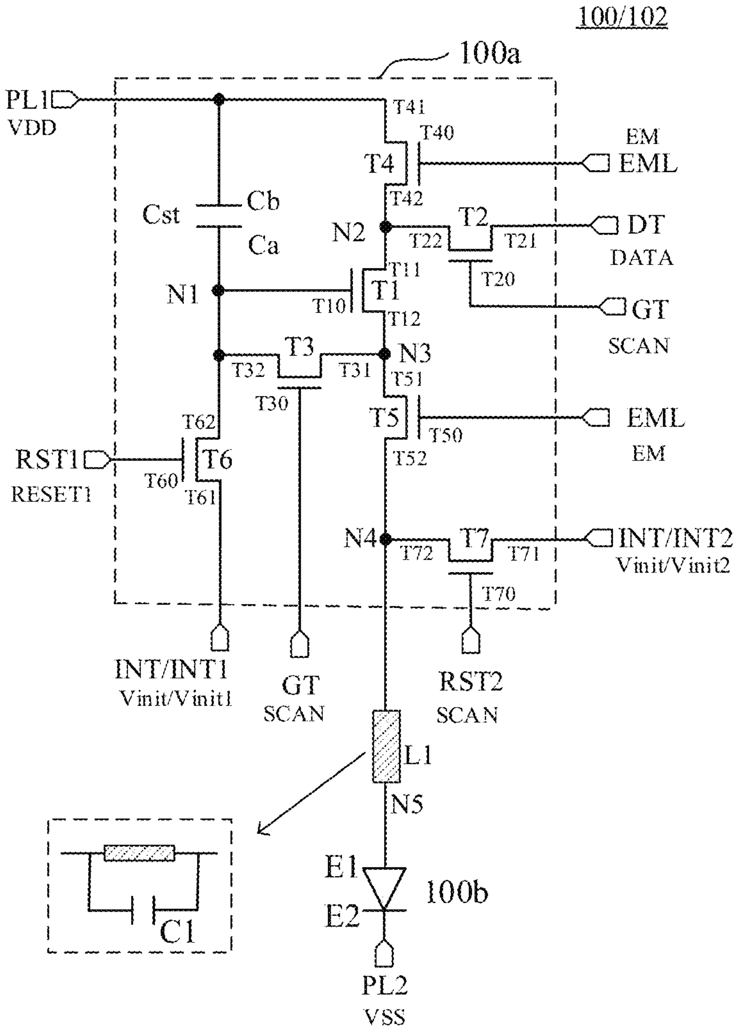
FIG. 10 is a schematic diagram of a second pixel circuit in the display panel provided by an embodiment of the present disclosure.

FIG. 5 is a schematic diagram of the pixel circuit in the display panel provided by an embodiment of the present disclosure. FIG. 6 is a layout diagram of the pixel circuit in the display panel provided by an embodiment of the present disclosure. FIG. 7 is a schematic diagram of the pixel circuit in the display panel provided by an embodiment of the present disclosure. FIG. 8 is a layout diagram of the pixel circuit in the display panel provided by an embodiment of the present disclosure. FIG. 9 is a cross-sectional view taken along line A-B of FIG. 6 or a cross-sectional view taken along line C-D of FIG. 8. FIG. 10 is a schematic diagram of a second pixel circuit in the display panel provided by an embodiment of the present disclosure. FIG. 5 and FIG. 7 illustrates a node N1 to a node N4, and FIG. 10 illustrates a node N5. For example, in some embodiments, referring to FIG. 5, a capacitor is formed between the first node N1 and the conductive line L1, and a capacitor is formed between the conductive line L1 and the fourth node N4, the conductive line L1 is coupled with the first node N1 and the fourth node N4, respectively, thereby resulting in a brightness difference and display defects (for example, forming stripes (Mura)), which affects a display quality.

The pixel circuit illustrated in FIG. 5 and FIG. 7 may be a low temperature polycrystalline silicon (LTPS) pixel circuit of AMOLED, but not limited thereto. The pixel circuit can also be a low-temperature polysilicon-oxide (LTPO) pixel circuit, which realizes a lower leakage and is beneficial to improving a stability of a voltage on a gate electrode of a driving transistor. The embodiments of the present disclosure are described by taking that the pixel circuit is the low temperature polycrystalline silicon (LTPS) pixel circuit of AMOLED as an example.

FIG. 5 is the pixel circuit of a first pixel unit 101 of the display panel provided by an embodiment of the present disclosure. FIG. 6 is a layout diagram of a first pixel circuit 10 of the display panel provided by an embodiment of the present disclosure. FIG. 7 is a pixel circuit of a second pixel unit 102 of the display panel provided by an embodiment of the present disclosure. FIG. 8 is a layout diagram of a second pixel circuit 20 of the display panel provided by an embodiment of the present disclosure. FIG. 10 illustrates a capacitor C1 formed by the conductive line L1 and other components overlapping with the conductive line L1. Capacitor C1 is a parasitic capacitor. Referring to FIG. 4, due to different lengths of the conductive lines, the capacitors of their own lines are also different. Therefore, due to an existence of the capacitor C1, a turn-on time of the image in the second display region will be delayed to varying degrees, that is, within a frame time, the second light-emitting element will emit light after a delay of several milliseconds, which has a high risk of screen flickering, which affects a uniformity of the image.

As illustrated in FIG. 5 to FIG. 8, the pixel circuit 100*a* includes six switching transistors (T2-T7), one driving transistor T1, and one storage capacitor Cst. The six switching transistors are a data writing transistor T2, a threshold compensation transistor T3, a first light-emitting control transistor T4, a second light-emitting control transistor T5, a first reset transistor T6, and a second reset transistor T7. The light-emitting element 100*b* includes a first electrode E1, a second electrode E2, and a light-emitting functional layer located between the first electrode E1 and the second electrode E2. For example, the first electrode E1 is an anode, and the second electrode E2 is a cathode. For example, the threshold compensation transistor T3 and the first reset transistor T6 adopt a dual-gate thin film transistors (TFT) to reduce leakage current.

As illustrated in FIG. 5 to FIG. 8, in some embodiments, the pixel unit 100 is disposed on the base substrate BS, the pixel unit 100 includes the pixel circuit 100*a* and the light-emitting element 100*b*, and the pixel circuit 100*a* is configured to drive the light-emitting element 100*b*, the pixel circuit 100*a* includes the driving transistor T1, the first reset transistor T6, and the second reset transistor T7, and the first reset transistor T6 is connected with the gate electrode T10 of the driving transistor T1, and is configured to reset the gate electrode T10 of the driving transistor T1, the second reset transistor T7 is connected with the first electrode E1 of the light-emitting element 100*b*, and is configured to reset the first electrode E1 of the light-emitting element 100*b*. The pixel unit 100 includes the first pixel unit 101 and the second pixel unit 102, the pixel circuit 100*a* (the first pixel circuit 10) of the first pixel unit 101 is located in the first display region R1 and at least partially overlaps with the light-emitting element 100_b_ (the first light-emitting element 30) of the first pixel unit 101, and the light-emitting element 100_b_ (the second light-emitting element 40) of the second pixel unit 102 is located in the second display region R2, the pixel circuit 100_a_ (the second pixel circuit 20) of the second pixel unit 102 is disposed outside the second display region R2, and the pixel circuit 100_a_ (the second pixel circuit 20) of the second pixel unit 102 is connected with the light-emitting element 100_b_ (the second light-emitting element 40) of the second pixel unit 102 through the conductive line L1. Although the embodiments of the present disclosure are described by taking a 7T1C pixel circuit as an example, the pixel circuit of the embodiments of the present disclosure is not limited to the 7T1C pixel circuit, any pixel circuit including the driving transistor T1, the first reset transistor T6, and the second reset transistor T7 can be used.

As illustrated in FIG. 5 to FIG. 8, the display panel includes a gate line GT, a data line DT, a first power supply line PL1, a second power supply line PL2, a light-emitting control signal line EML, an initialization signal line INT, a reset control signal line RST, and the like. For example, the reset control signal line RST includes a first reset control signal line RST1 and a second reset control signal line RST2. The first power supply line PL1 is configured to supply a constant first voltage signal VDD to the pixel unit 100, the second power supply line PL2 is configured to supply a constant second voltage signal VSS to the pixel unit 100, and the first voltage signal VDD is greater than the second voltage signal VSS. The gate line GT is configured to supply a scan signal SCAN to the pixel unit 100, the data line DT is configured to supply a data signal DATA (data voltage VDATA) to the pixel unit 100, the light-emitting control signal line EML is configured to supply a light-emitting control signal EM to the pixel unit 100, the first reset control signal line RST1 is configured to supply a first reset control signal RESET1 to the pixel unit 100, and the second reset control signal line RST2 is configured to supply a scan signal SCAN to the pixel unit 100. For example, in one row of pixel units, the second reset control signal line RST2 may be connected with the gate line GT so as to be input with the scan signal SCAN. Of course, the second reset control signal line RST2 may also be input with the second reset control signal RESET2.

FIG. 10 is a schematic diagram of the circuit principle of the conductive line and a loading of the conductive line. The turn-on time of the second light-emitting element 40 is related to a voltage difference between the node N5 and the second voltage signal VSS on the second power supply line PL2. When the voltage difference of the node N5 and the second voltage signal VSS on the second power supply line PL2 reaches a turn-on voltage of the second light-emitting element 40, the second light-emitting element 40 starts to emit light. A voltage change of the node N5 starts from the voltage on the node N4 after being reset by the second reset transistor, and the voltage continues to rise in a light-emitting phase until the voltage difference between the node N5 and the second voltage signal VSS reaches the turn-on voltage of the second light-emitting element 40.

For example, as illustrated in FIG. 5 to FIG. 8, the first initialization signal line INT1 is configured to supply a first initialization signal Vinit1 to the pixel unit 100. The second initialization signal line INT2 is configured to supply a second initialization signal Vinit2 to the pixel unit 100.

For example, as illustrated in FIG. 7 to FIG. 8, the third initialization signal line INT3 is configured to supply a first initialization signal Vinit1 to the pixel unit 100. The fourth initialization signal line INT4 is configured to supply a second initialization signal Vinit2 to the pixel unit 100.

For example, the first initialization signal Vinit1 and the second initialization signal Vinit2 are constant voltage signals, and their magnitudes may be between the first voltage signal VDD and the second voltage signal VSS, but are not limited thereto. For example, the first initialization signal Vinit1 and the second initialization signal Vinit2 may both be less than or equal to the second voltage signal VSS. For example, the second initialization signal Vinit2 is greater than the first initialization signal Vinit1. The display panel provided by the embodiment of the present disclosure, by increasing the second initialization signal Vinit2 so that the second initialization signal Vinit2 is greater than the first initialization signal Vinit1, the voltage on the node N5 is charged to a higher position in the reset phase, then, the time during which the voltage of the node N5 rises in the light-emitting phase is shortened, and the turn-on time of the second light-emitting element 40 is advanced. In this way, all the second light-emitting elements 40 in the second display region uniformly emit light, which improves the uniformity of the display image. In addition, compared with the first display region, the second display region will not delay emitting light due to a large loading of the conductive line L1. In some embodiments, the second initialization signal Vinit2 can be set to different voltage values for high grayscale, low grayscale, and black state image, that is, the second initialization signal Vinit2 is not a constant voltage signal, so as to eliminate a current difference between the second display region and the first display region, improve the uniformity of the image. For example, the second initialization signal Vinit2 may adopt different voltage signals according to the three situations of high grayscale, low grayscale, and black state image respectively. For example, the second initialization signal Vinit2 includes three voltage signals with different values.

As illustrated in FIG. 5 to FIG. 8, the driving transistor T1 is electrically connected with the light-emitting element 100_b_, and outputs a driving current to drive the light-emitting element 100_b_ to emit light under the control of the scan signal SCAN, the data signal DATA, the first voltage signal VDD, the second voltage signal VSS, and other signals.

For example, the light-emitting element 100_b_ includes an organic light-emitting diode (OLED), and the light-emitting element 100_b_ emits red light, green light, blue light, or white light under the driving of its corresponding pixel circuit 100_a_. For example, one pixel includes a plurality of pixel units. One pixel may include a plurality of pixel units that emit light of different colors. For example, one pixel includes a pixel unit that emits red light, a pixel unit that emits green light, and a pixel unit that emits blue light, but it is not limited to this. The number of pixel units included in a pixel and the light-emitting condition of each pixel unit can be determined according to needs.

As illustrated in FIG. 5 to FIG. 8, the first reset transistor T6 is connected with the gate electrode T10 of the driving transistor T1 and is configured to reset the gate electrode of the driving transistor T1, and the second reset transistor T7 is connected with the first electrode E1 of the light-emitting element 100_b_ and is configured to reset the first electrode E1 of the light-emitting element 100_b_.

As illustrated in FIG. 5 and FIG. 6, the first initialization signal line INT1 is connected with the gate electrode of the driving transistor T1 through the first reset transistor T6. The second initialization signal line INT2 is connected with the first electrode E1 of the light-emitting element 100*b* (the first light-emitting element 30) through the second reset transistor T7.

As illustrated in FIG. 7 and FIG. 8, the third initialization signal line INT3 is connected with the gate electrode of the driving transistor T1 through the first reset transistor T6. The fourth initialization signal line INT4 is connected with the first electrode E1 of the light-emitting element 100*b* (the second light-emitting element 40) through the second reset transistor T7.

For example, as illustrated in FIG. 5 to FIG. 8, a gate electrode T60 of the first reset transistor T6 is connected with the first reset control signal line RST1, and a gate electrode T70 of the second reset transistor T7 is connected with the second reset control signal line RST2.

For example, as illustrated in FIG. 5 to FIG. 8, a second electrode T62 of the first reset transistor T6 is connected with the gate electrode T10 of the driving transistor T1, a second electrode T72 of the second reset transistor T7 is connected with the first electrode E1 of the light-emitting element 100*b*.

For example, as illustrated in FIG. 5 and FIG. 6, a first electrode T61 of the first reset transistor T6 is connected with the first initialization signal line INT1, a first electrode T71 of the second reset transistor T7 is connected with the second initialization signal line INT2. That is, the first initialization signal line INT1 is connected with the first electrode T61 of the first reset transistor T6 in the first pixel unit 101, and the second initialization signal line INT2 is connected with the first electrode T71 of the second reset transistor T7 in the first pixel unit 101.

For example, as illustrated in FIG. 7 and FIG. 8, a first electrode T61 of the first reset transistor T6 is connected with the third initialization signal line INT3, a first electrode T71 of the second reset transistor T7 is connected with the fourth initialization signal line INT4. That is, the third initialization signal line INT3 is connected with the first electrode T61 of the first reset transistor T6 in the second pixel unit 102, and the fourth initialization signal line INT4 is connected with the first electrode T71 of the second reset transistor T7 in the second pixel unit 102.

For example, as illustrated in FIG. 5 to FIG. 8, a gate electrode T20 of the data writing transistor T2 is connected with the gate line GT, a first electrode T21 of the data writing transistor T2 is connected with the data line DT, and a second electrode T22 of the data writing transistor T2 is connected with a first electrode T11 of the driving transistor T1.

For example, as illustrated in FIG. 5 to FIG. 8, a gate electrode T30 of the threshold compensation transistor T3 is connected with the gate line GT, a first electrode T31 of the threshold compensation transistor T3 is connected with a second electrode T12 of the driving transistor T1, and a second electrode T32 of the threshold compensation transistor T3 is connected with a gate electrode T10 of the driving transistor T1.

For example, as illustrated in FIG. 5 to FIG. 8, a gate electrode T40 of the first light-emitting control transistor T4 is connected with the light-emitting control signal line EML, a first electrode T41 of the first light-emitting control transistor T4 is connected with the first power supply line PL1, and a second electrode T42 of the first light-emitting control transistor T4 is connected with the first electrode T11 of the driving transistor T1. A gate electrode T50 of the second light-emitting control transistor T5 is connected with the light-emitting control signal line EML, a first electrode T51 of the second light-emitting control transistor T5 is connected with the second electrode T12 of the driving transistor T1, and a second electrode T52 of the second light-emitting control transistors T5 is connected with a first electrode E1 of the light-emitting element 100*b*.

As illustrated in FIG. 5 and FIG. 7, the pixel circuit further includes the storage capacitor Cst, a first electrode Ca of the storage capacitor Cst is connected with the gate electrode T10 of the driving transistor T1, and a second electrode Cb of the storage capacitor Cst is connected with the first power supply line PL1.

For example, as illustrated in FIG. 5, the second power supply line PL2 is connected with a second electrode E2 of the light-emitting element 100*b*.

As illustrated in FIG. 6, the driving transistor T1 includes the gate electrode T10. Referring to FIG. 6 and FIG. 8, the second electrode Cb of the storage capacitor Cst has an opening OPN1, and one end of the connecting electrode CE1 is connected with the gate electrode T10 of the driving transistor T1 through the opening OPN1.

For example, referring to FIG. 3, an orthographic projection of at least one of the plurality of conductive lines L1 on the base substrate BS partially overlaps with an orthographic projection of the pixel circuit (the first pixel circuit 10) of the first pixel unit 101 on the base substrate BS.

Referring to FIG. 6 and FIG. 9, a buffer layer BL is disposed on the base substrate BS, an isolation layer BR is disposed on the buffer layer BL, an active layer LY0 is disposed on the isolation layer BR, a first insulating layer ISL1 is disposed on the active layer LY0, a first conductive layer LY1 is disposed on the first insulating layer ISL1, a second insulating layer ISL2 is disposed on the first conductive layer LY1, a second conductive layer LY2 is disposed on the second insulating layer ISL2, a third insulating layer ISL3 is disposed on the second conductive layer LY2, and a third conductive layer LY3 is disposed on the third insulating layer ISL3. The third conductive layer LY3 includes a connecting electrode CE0, and the connecting electrode CE0 is connected with the second electrode T52 of the second light-emitting control transistor T5 through a via hole H3 penetrating the first insulating layer ISL1, the second insulating layer ISL2, and the third insulating layer ISL3.

As illustrated in FIG. 6 and FIG. 8, one end of the connecting electrode CE1 is connected with the gate electrode T10 of the driving transistor T1 through a via hole H1, and the other end of the connecting electrode CE1 is connected with the second electrode T62 of the first reset transistor T6 through a via hole H2.

As illustrated in FIG. 6, one end of the connecting electrode CE2 is connected with the first initialization signal line INT1 through a via hole H4, and the other end of the connecting electrode CE2 is connected with the first electrode T61 of the first reset transistor T6 through a via hole H5. One end of the connecting electrode CE3 is connected with the second initialization signal line INT2 through a via hole H6, and the other end of the connecting electrode CE3 is connected with the first electrode T71 of the second reset transistor T7 through a via hole H7.

As illustrated in FIG. 8, one end of the connecting electrode CE2 is connected with the third initialization signal line INT3 through the via hole H4, and the other end of the connecting electrode CE2 is connected with the first electrode T61 of the first reset transistor T6 through the via hole H5. One end of the connecting electrode CE3 is connected with the fourth initialization signal line INT4 through the via hole H6, and the other end of the connecting electrode CE3 is connected with the first electrode T71 of the second reset transistor T7 through the via hole H7.

As illustrated in FIG. 6 and FIG. 8, the first power supply line PL1 is connected with the first electrode T41 of the first light-emitting control transistor T4 through a via hole H8. The first power supply line PL1 is connected with the second electrode Cb of the storage capacitor Cst through a via hole H9. The first power supply line PL1 is connected with a block BK through a via hole Hk. The data line DT is connected with the first electrode T21 of the data writing transistor T2 through a via hole H0.

As illustrated in FIG. 6 and FIG. 8, a channel of each transistor as well as the first electrode and the second electrode on both sides of the channel are located in the active layer LY0; the first reset control signal line RST1, the gate line GT, the gate electrode T10 (the first electrode Ca of the storage capacitor Cst) of the driving transistor, the light-emitting control signal line EML, and the second reset control signal line RST2 are located in the first conductive layer LY1; the first initialization signal line INT1, the second electrode Cb of the storage capacitor Cst, the second initialization signal line INT2, the third initialization signal line INT3, and the fourth initialization signal line INT4 are located in the second conductive layer LY2; the data line DT, the first power supply line PL1, the connecting electrode CE1, the connecting electrode CE2, the connecting electrode CE3, and the connecting electrode CE0 are located in the third conductive layer LY3.

As illustrated in FIG. 6 and FIG. 8, the first initialization signal line INT1, the first reset control signal line RST1, the gate line GT, the light-emitting control signal line EML, the second initialization signal line INT2, the third initialization signal line INT3, the fourth initialization signal line INT4, and the second reset control signal lines RST2 all extend in the first direction X. As illustrated in FIG. 6 and FIG. 8, the data line DT and the first power supply line PL1 both extend in the second direction Y.

For example, in a manufacturing process of the display panel, a self-aligned process is adopted, and a semiconductor patterned layer is subject to a converting-into-conductor process by using the first conductive layer LY1 as a mask. The semiconductor patterned layer can be formed by patterning a semiconductor film. For example, the semiconductor patterned layer is heavily doped by ion implantation, so that the part of the semiconductor patterned layer that is not covered by the first conductive layer LY1 is converted into conductor, and a source electrode region (the first electrode T11) and a drain electrode region (the second electrode T12) of the driving transistor T1, a source electrode region (the first electrode T21) and a drain electrode region (the second electrode T22) of the data writing transistor T2, a source electrode region (the first electrode T31) and a drain electrode region (the second electrode T32) of the threshold compensation transistor T3, a source electrode region (the first electrode T41) and a drain electrode region (the second electrode T42) of the first light-emitting control transistor T4, a source electrode region (the first electrode T51) and a drain electrode region (the second electrode T52) of the second light-emitting control transistor T5, a source electrode region (the first electrode T61) and a drain electrode region (the second electrode T62) of the first reset transistor T6, and a source electrode region (the first electrode T71) and a drain electrode region (the second electrode T72) of the second reset transistor T7 are formed. The part of the semiconductor patterned layer covered by the first conductive layer LY1 retains semiconductor characteristics, and can form a channel region of the driving transistor T1, a channel region of the data writing transistor T2, a channel region of the threshold compensation transistor T3, a channel region of the first light-emitting control transistor T4, a channel region of the second light-emitting control transistor T5, a channel region of the first reset transistor T6, and a channel region of the second reset transistor T7. For example, as illustrated in FIG. 6, the second electrode T72 of the second reset transistor T7 and the second electrode T52 of the second light-emitting control transistor T5 are formed as an integrated structure; the first electrode T51 of the second light-emitting control transistor T5, the second electrode T12 of the driving transistor T1, and the first electrode T31 of the threshold compensation transistor T3 are formed as an integrated structure; the first electrode T11 of the driving transistor T1, the second electrode T22 of the data writing transistor T2, and the second electrode T42 of the first light-emitting control transistor T4 are formed as an integrated structure; and the second electrode T32 of the threshold compensation transistor T3 and the second electrode T62 of the first reset transistor T6 are formed as an integrated structure. In some embodiments, as illustrated in FIG. 6, the first electrode T71 of the second reset transistor T7 and the first electrode T61 of the first reset transistor T6 may be formed as an integrated structure.

For example, the channel regions of the transistors adopted by the embodiment of the present disclosure may be monocrystalline silicon, polycrystalline silicon (such as low temperature polycrystalline silicon), or metal oxide semiconductor materials (such as IGZO, AZO, etc.). In one embodiment, the transistors are all P-type low temperature polycrystalline silicon (LTPS) thin film transistors. In another embodiment, the threshold compensation transistor T3 and the first reset transistor T6, that are directly connected with the gate electrode of the driving transistor T1, are metal oxide semiconductor thin film transistors, that is, the channel material of the transistor is a metal oxide semiconductor material (such as IGZO, AZO, etc.). The metal oxide semiconductor thin film transistor has a lower leakage current, which can help reduce the leakage current of the gate electrode of the driving transistor T1.

For example, the transistors adopted by the embodiments of the present disclosure may include various structures, such as a top gate type, a bottom gate type, or a dual-gate structure. In one embodiment, the threshold compensation transistor T3 and the first reset transistor T6, which are directly connected with the gate electrode of the driving transistor T1, are dual-gate thin film transistors, which can help reduce the leakage current of the gate electrode of the driving transistor T1.

For example, the display panel further includes a pixel definition layer and a spacer. The pixel definition layer has an opening, and the opening is configured to define the light-emitting region (light-exiting region, effective light-emitting region) of the pixel unit. The spacer is configured to support a fine metal mask when forming the light-emitting functional layer.

For example, the opening of the pixel definition layer is the light-exiting region of the pixel unit. The light-emitting functional layer is disposed on the first electrode E1 of the light-emitting element **100*b*, and the second electrode E2 of the light-emitting element 100*b* is disposed on the light-emitting functional layer. For example, an encapsulation layer is disposed on the light-emitting element 100*b*. The encapsulation layer includes a first encapsulation layer, a second encapsulation layer, and a third encapsulation layer. For example, the first encapsulation layer and the third encapsulation layer are inorganic material layers, and the second encapsulation layer is an organic material layer. For example, the first electrode E1 is the anode of the light-emitting element 100***b*, and the second electrode E2 is the cathode of the light-emitting element 100*b*, but not limited thereto.

Figure 11:
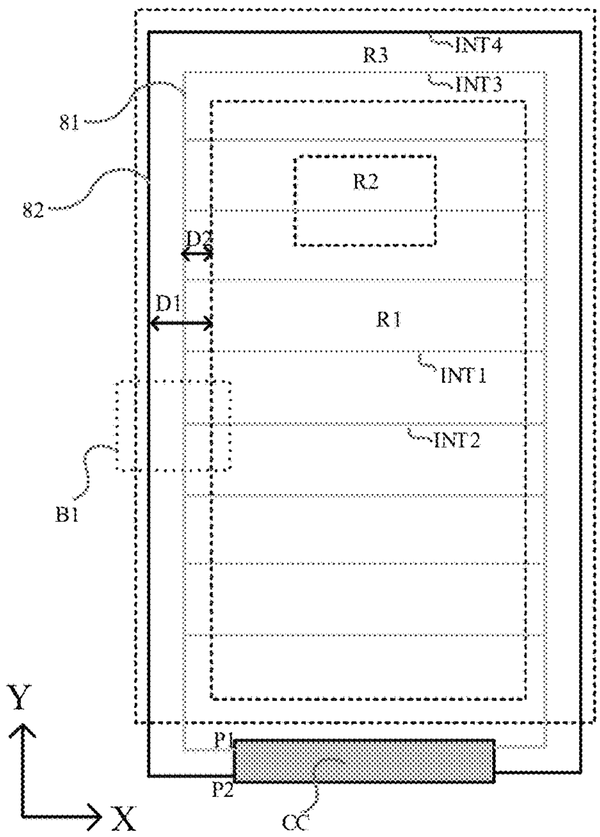
FIG. 11 is a schematic diagram of the display panel provided by an embodiment of the present disclosure.
Figure 12:
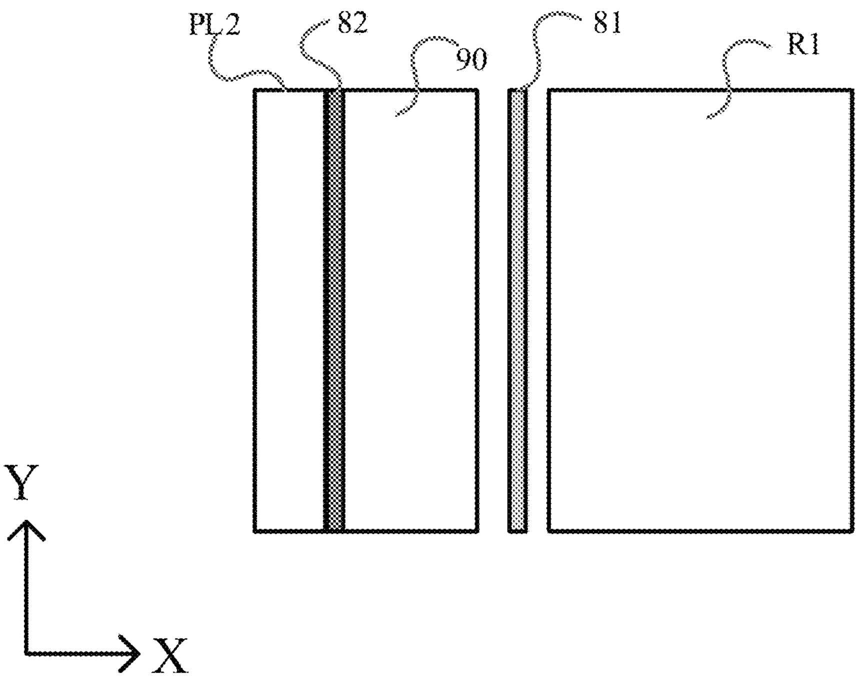
FIG. 12 is a schematic diagram at box B1 in FIG. 11.
Figure 13:
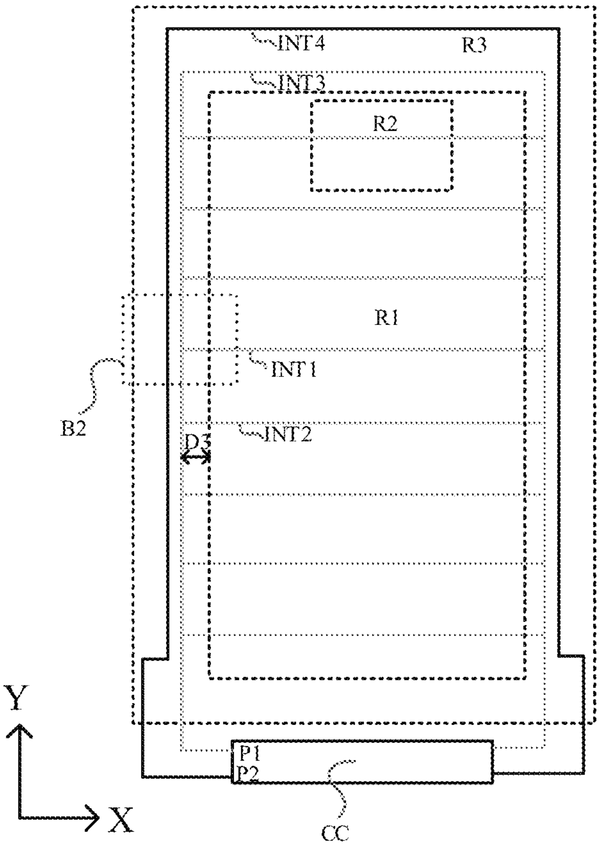
FIG. 13 is a schematic diagram of the display panel provided by an embodiment of the present disclosure.
Figure 14:
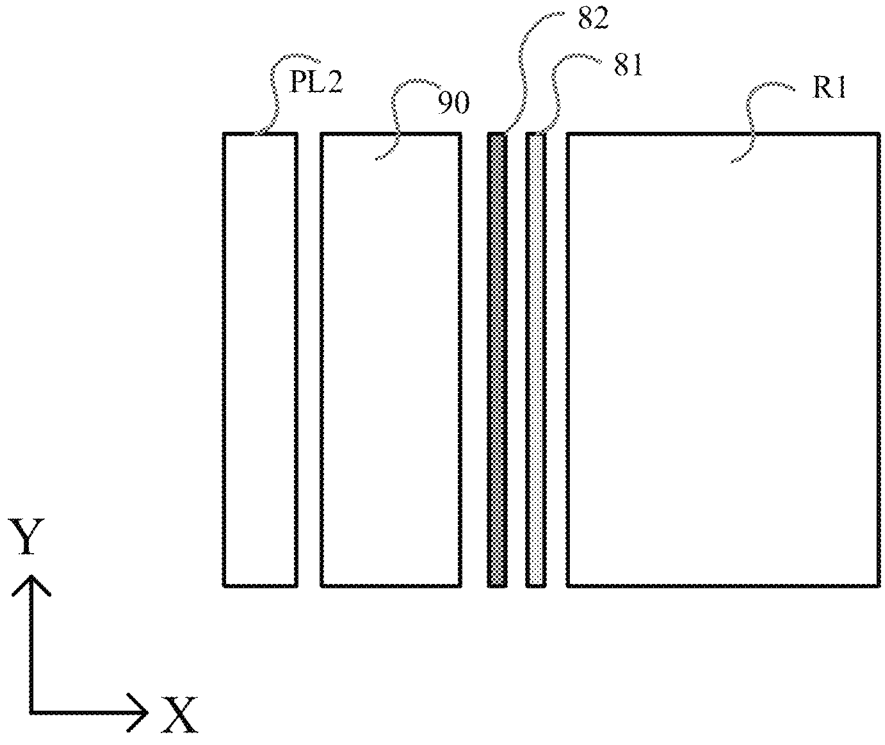
FIG. 14 is a schematic diagram at box B2 in FIG. 13.
Figure 15:
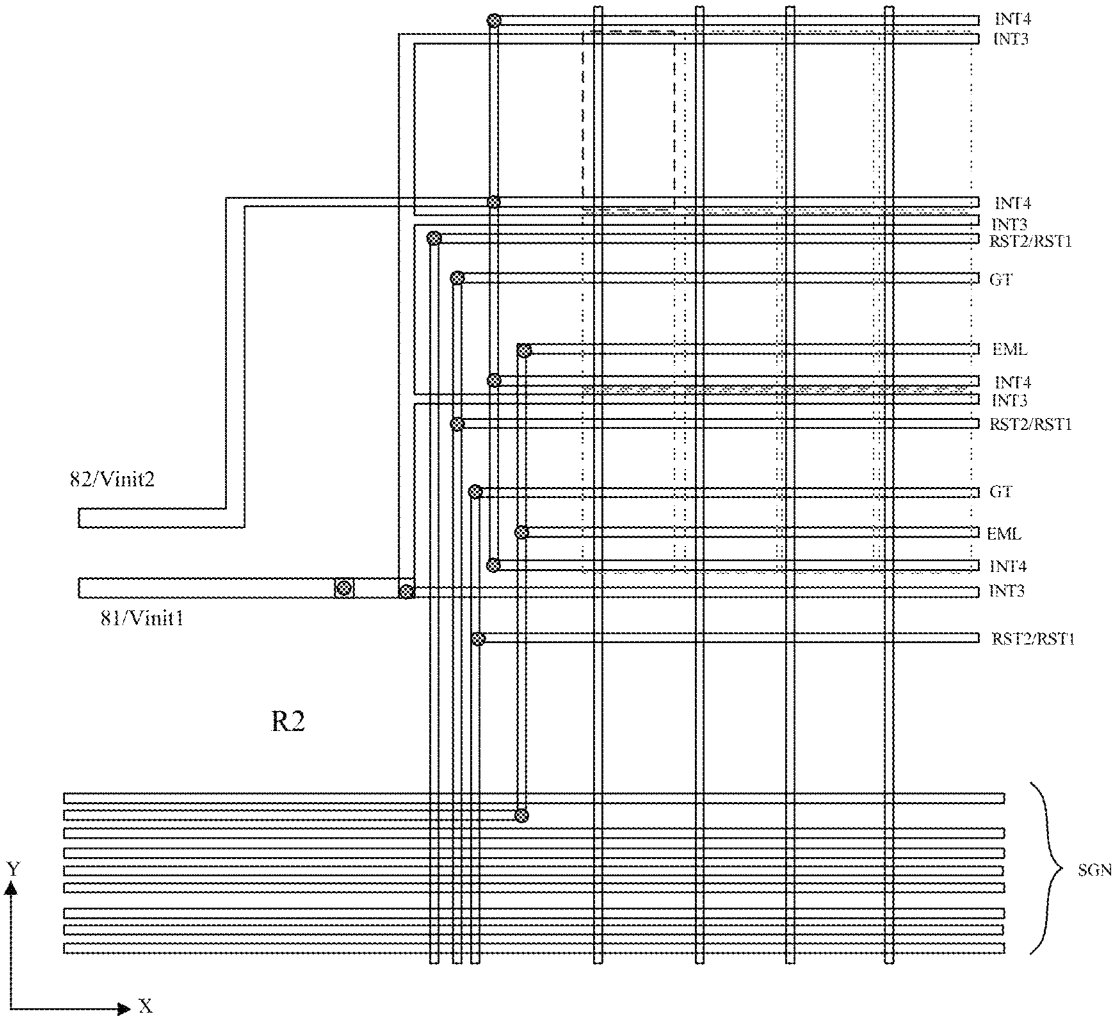
FIG. 15 is a schematic partial diagram of the display panel provided by an embodiment of the present disclosure.
Figure 16:
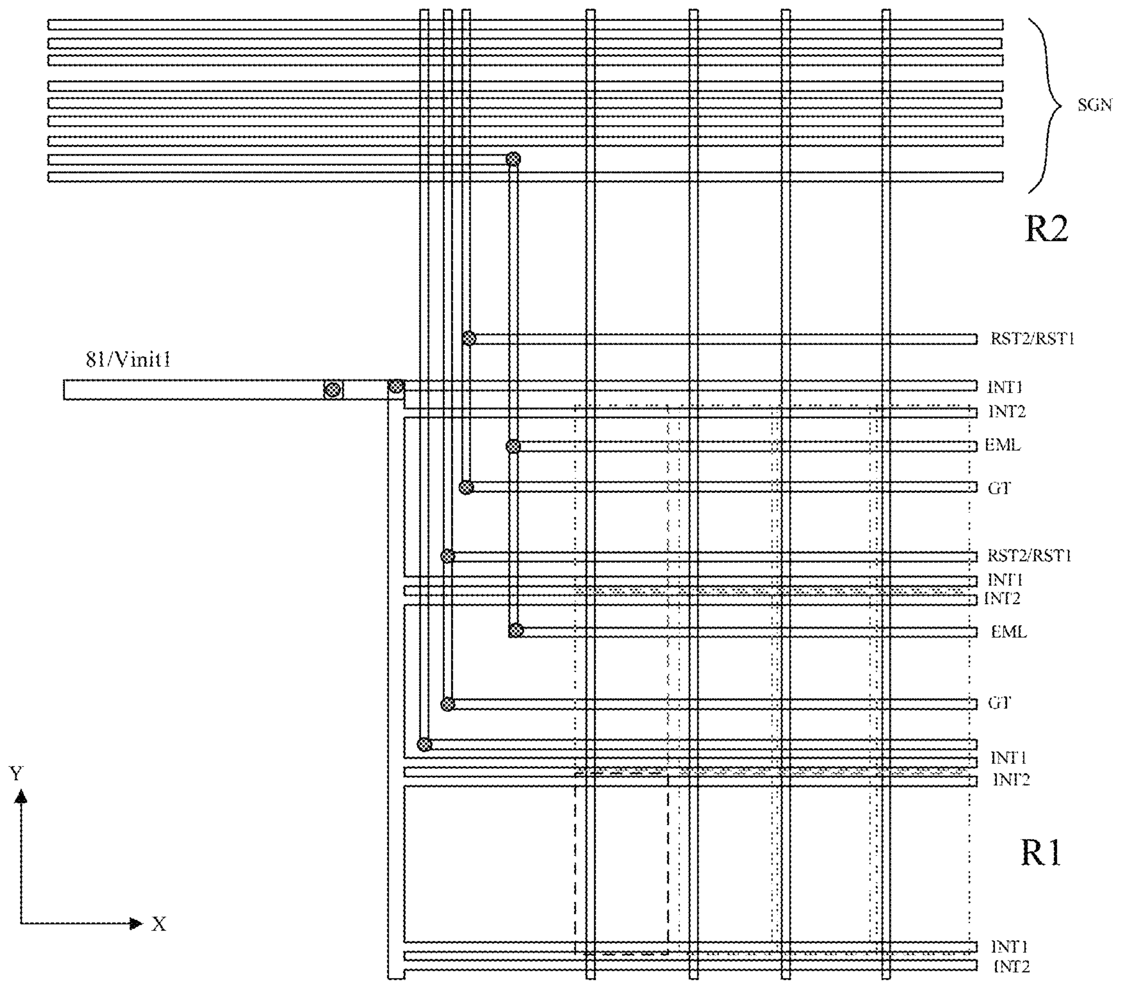
FIG. 16 is a schematic partial diagram of the display panel provided by an embodiment of the present disclosure.

FIG. 11 is a schematic diagram of the display panel provided by an embodiment of the present disclosure. FIG. 12 is a schematic diagram at box B1 in FIG. 11. FIG. 13 is a schematic diagram of the display panel provided by an embodiment of the present disclosure. FIG. 14 is a schematic diagram at box B2 in FIG. 13. FIG. 15 is a schematic partial diagram of the display panel provided by an embodiment of the present disclosure. FIG. 16 is a schematic partial diagram of the display panel provided by an embodiment of the present disclosure.

As illustrated in FIG. 11 to FIG. 16, the display panel further includes a first signal bus line 81 and a second signal bus line 82, the first signal bus line 81 is configured to supply the first initialization signal Vinit1, and the second signal bus line 82 is configured to supply the second initialization signal Vinit2. The first signal bus line 81 and the second signal bus line 82 are insulated from each other so as to be configured to input different initialization signals. The first signal bus line 81 and the second signal bus line 82 are insulated from each other to supply signals, respectively. The first signal bus line 81 and the second signal bus line 82 are configured to supply different signals. The second initialization signal Vinit2 is greater than the first initialization signal Vinit1, so as to shorten the turn-on time of the second light-emitting element 40 and improve the display uniformity.

For example, a width of the first signal bus line 81 is greater than a width of the second signal bus line 82. In some embodiments, the width of the first signal bus line 81 is 20 μm, and the width of the second signal bus line 82 is 10 μm. For example, in an embodiment of the present disclosure, the width of the line is a size in a direction perpendicular to the extending direction of the line.

For example, as illustrated in FIG. 11, a distance between the second signal bus line 82 and the display region R1 of the display panel is D1. For example, in some embodiments, the distance D1 is 500-600 μm, but not limited thereto.

For example, as illustrated in FIG. 11, a distance between the first signal bus line 81 and the display region R1 of the display panel is D2. Distance D2 is smaller than distance D1.

As illustrated in FIG. 11, FIG. 13, FIG. 15 and FIG. 16, the first initialization signal line INT1, the second initialization signal line INT2, and the third initialization signal line INT3 are connected with the first signal bus line 81, respectively. As illustrated in FIG. 11, FIG. 13 and FIG. 15, the second signal bus line 82 is connected with the fourth initialization signal line INT4.

For example, referring to FIG. 3 and FIG. 4, an orthographic projection of the pixel circuit of the second pixel unit 102 on the base substrate BS does not overlap with an orthographic projection of the light-emitting element of the second pixel unit 102 on the base substrate BS. That is, the orthographic projection of the second pixel circuit 20 on the base substrate BS does not overlap with the orthographic projection of the second light-emitting element 40 on the base substrate BS.

For example, referring to FIG. 3 and FIG. 4, the base substrate BS further includes a peripheral region R3 located on at least one side of the display region R0, and the pixel circuit of the second pixel unit 102 is located in the peripheral region R3. That is, the second pixel circuit 20 is located in the peripheral region R3.

For example, as illustrated in FIG. 11 and FIG. 13, at least a part of the first signal bus line 81 and at least a part of the second signal bus line 82 are both located in the peripheral region R3.

For example, as illustrated in FIG. 11 and FIG. 13, the first signal bus line 81 and the second signal bus line 82 are connected with different pins of the integrated circuit CC, respectively. FIG. 11 and FIG. 13 illustrate the first pin P1 and the second pin P2. As illustrated in FIG. 11 and FIG. 13, the first signal bus line 81 is connected with the first pin P1 of the integrated circuit CC, and the second signal bus line 82 is connected with the second pin P2 of the integrated circuit CC. The first pin P1 and the second pin P2 are two different pins. The first pin P1 and the second pin P2 are not connected with each other. The first initialization signal Vinit1 and the second initialization signal Vinit2 are from the integrated circuit CC.

For example, the first signal bus line 81 is closer to the display region R0 than the second signal bus line 82.

For example, as illustrated in FIG. 5, FIG. 7, FIG. 12 and FIG. 14, the display panel further includes a second power supply line PL2 configured to supply a constant second voltage signal to the pixel circuit. The second power supply line PL2 is connected with the second electrode of the light-emitting element, and at least a part of the second signal bus line 82 is located between the second power supply line PL2 and the display region R0. For example, the second power supply line PL2 is located in the peripheral region R3.

For example, as illustrated in FIG. 12 and FIG. 14, the first signal bus line 81 is located between the second power supply line PL2 and the display region R0.

For example, as illustrated in FIG. 12, the display panel further includes a control circuit 90, the control circuit 90 is located between the second power supply line PL2 and the display region R0, and at least a part of the first signal bus line 81 is located between the control circuit 90 and the display region R0, at least a part of the second signal bus line 82 is located between the control circuit 90 and the second power supply line PL2. For example, in some embodiments, to facilitate obtaining a narrow bezel, an orthographic projection of the second signal bus line 82 on the base substrate BS at least partially overlaps with an orthographic projection of the control circuit 90 on the base substrate BS. For example, in some embodiments, to facilitate obtaining a narrow bezel, an orthographic projection of the second signal bus line 82 on the base substrate BS at least partially overlaps with an orthographic projection of the second power supply line PL2 on the base substrate BS. As illustrated in FIG. 12, to facilitate obtaining the narrow bezel, the second signal bus line 82 at least partially overlaps with the second power supply line PL2, and the second signal bus line 82 at least partially overlaps with the control circuit 90.

For example, the control circuit 90 includes a gate driving circuit on the array (GOA circuit).

In other embodiments, the second signal bus line 82 may not overlap with the second power supply line PL2 and may not overlap with the control circuit 90.

For example, as illustrated in FIG. 14, the display panel further includes a control circuit 90, the control circuit 90 is located between the second power supply line PL2 and the display region R0, and at least a part of the first signal bus line 81 and at least a part of the second signal bus line 82 are located between the control circuit 90 and the display region R0.

For example, as illustrated in FIG. 13, a space between the second signal bus line 82 and the first signal bus line 81 is about 5-8 μm, and a distance D3 between the first signal bus line 81 and the display region R0 is 30-35 μm, but not limited thereto.

Figure 17:
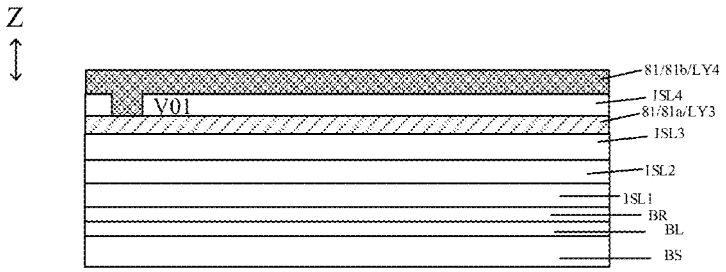
FIG. 17 is a schematic diagram of a first signal bus line in the display panel provided by an embodiment of the present disclosure.

FIG. 17 is a schematic diagram of a first signal bus line in the display panel provided by an embodiment of the present disclosure. For example, as illustrated in FIG. 17, in order to reduce a resistance and reduce the loading, the first signal bus line 81 includes two sub-lines located in the third conductive layer LY3 and the fourth conductive layer LY4, respectively, and connected through the via hole V01. FIG. 17 illustrates the first sub-line 81*a* located in the third conductive layer LY3 and the second sub-line 81*b* located in the fourth conductive layer LY4. The via hole V01 penetrates the fourth insulating layer ISL4.

Figure 18:
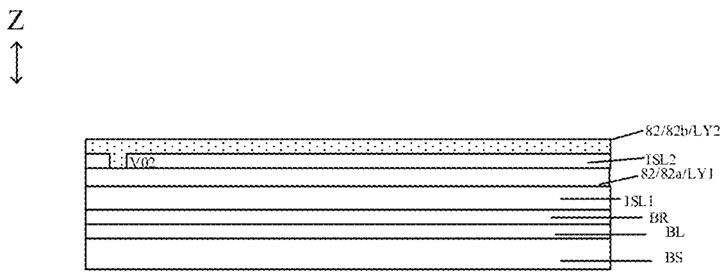
FIG. 18 is a schematic diagram of a second signal bus line in the display panel provided by an embodiment of the present disclosure.

FIG. 18 is a schematic diagram of a second signal bus line 82 in the display panel provided by an embodiment of the present disclosure. For example, as illustrated in FIG. 18, in order to reduce the resistance and reduce the loading, the second signal bus line 82 includes two sub-lines located in the first conductive layer LY1 and the second conductive layer LY2, respectively, and connected through the via hole V02. FIG. 18 illustrates the first sub-line 82*a* located in the first conductive layer LY1 and the second sub-line 82*b* located in the second conductive layer LY2.

Of course, in other embodiments, the first signal bus line 81 may further include two sub-lines located in the first conductive layer LY1 and the second conductive layer LY2, respectively, and connected through a via hole. In other embodiments, the second signal bus line 82 may further include two sub-lines located in the third conductive layer LY3 and the fourth conductive layer LY4, respectively, and connected through a via hole. Of course, the layers where the two sub-lines are located in the display panel provided by the embodiments of the present disclosure are not limited to the above description, as long as the two sub-lines are located in two different conductive layers, and the two sub-lines are connected through a via hole penetrating a layer between the two different conductive layers.

For example, the transistors in the pixel circuit of the embodiment of the present disclosure are all thin film transistors. For example, the first conductive layer LY1, the second conductive layer LY2, and the third conductive layer LY3 are all made of metal materials. For example, the first conductive layer LY1 and the second conductive layer LY2 are formed of metal materials such as nickel and aluminum, etc., but are not limited thereto. For example, the third conductive layer LY3 and the fourth conductive layer LY4 are formed of materials such as titanium, molybdenum and aluminum, etc., but are not limited thereto. For example, the third conductive layer LY3 or the fourth conductive layer LY4 adopts a structure formed by three sub-layers of Ti/Al/Ti, but is not limited thereto. For example, the base substrate may be a glass substrate or a polyimide substrate, but is not limited thereto, and can be selected as required. For example, the buffer layer BL, the isolation layer BR, the first insulating layer ISL1, the second insulating layer ISL2, the third insulating layer ISL3, and the fourth insulating layer IS4 are all made of insulating materials. At least one of the buffer layer BL, the isolation layer BR, the first insulating layer ISL1, the second insulating layer ISL2, the third insulating layer ISL3, and the fourth insulating layer ISL4 is made of inorganic insulating materials. The materials of the first electrode E1 and the second electrode E2 of the light-emitting element can be selected as required. In some embodiments, the first electrode E1 may adopt at least one of transparent conductive metal oxide and silver, but is not limited thereto. For example, the transparent conductive metal oxide includes indium tin oxide (ITO), but is not limited thereto. For example, the first electrode E1 may adopt a structure in which three sub-layers of ITO-Ag-ITO are stacked. In some embodiments, the second electrode E2 may adopt a metal of low work function, for example may adopt at least one of magnesium and silver, but is not limited thereto.

For example, in an embodiment of the present disclosure, the first direction X and the second direction Y are directions parallel with a main surface of the base substrate, and the third direction Z is a direction perpendicular to the main surface of the base substrate. The main surface of the base substrate is the surface on which various elements are formed. An upper surface of the base substrate in FIG. 22A is its main surface. For example, the first direction X intersects with the second direction Y. For further example, the first direction X is perpendicular to the second direction Y. For example, the first direction X is the row direction, and the second direction Y is the column direction.

Figure 19:
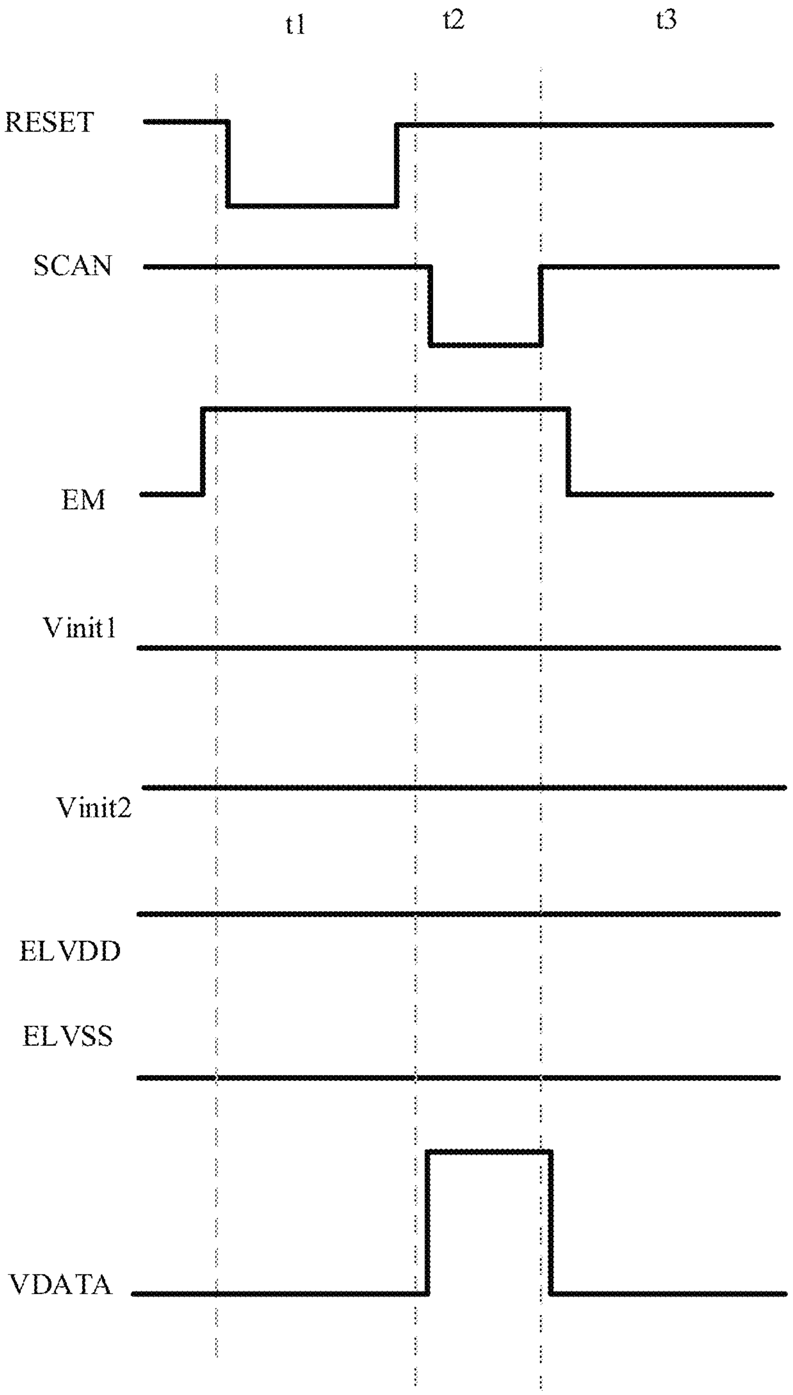
FIG. 19 is a timing signal diagram of one pixel unit in the display panel provided by an embodiment of the present disclosure.

FIG. 19 is a timing signal diagram of one pixel unit in the display panel provided by an embodiment of the present disclosure. A method for driving one pixel unit in the display panel provided by the embodiment of the present disclosure will be described below with reference to FIG. 5, FIG. 7, and FIG. 19.

As illustrated in FIG. 19, within a frame display period, the driving method of the pixel unit includes a first reset phase t1, a data writing and threshold compensation as well as second reset phase t2, and a light-emitting phase t3.

In the first reset phase t1, the light-emitting control signal EM is set to be a turn-off voltage, the reset control signal RESET is set to be a turn-on voltage, and the scan signal SCAN is set to be a turn-off voltage.

In the data writing and threshold compensation as well as the second reset phase t2, the light-emitting control signal EM is set to be a turn-off voltage, the reset control signal RESET is set to be a turn-off voltage, and the scan signal SCAN is set to be a turn-on voltage.

In the light-emitting phase t3, the light-emitting control signal EM is set to be a turn-on voltage, the reset control signal RESET is set to be a turn-off voltage, and the scan signal SCAN is set to be a turn-off voltage.

As illustrated in FIG. 19, a first voltage signal ELVDD, a second voltage signal ELVSS, the first initialization signal Vinit1 and the second initialization signal Vinit2 are all constant voltage signals, and the first initialization signal Vinit1 is between the first voltage signal ELVDD and the second voltage signal ELVSS, the second initialization signal Vinit2 is between the first voltage signal ELVDD and the second voltage signal ELVSS. The second initialization signal Vinit2 is greater than the first initialization signal Vinit1. It should be noted that, FIG. 19 is described with reference to the case where the second initialization signal Vinit2 is a constant voltage, by way of example.

For example, in some embodiments, the first initialization signal Vinit1 is a negative voltage, and the second initialization signal Vinit2 is also a negative voltage. For further example, the first initialization signal Vinit1 is in a range of −3V to −2.5V, and the second initialization signal Vinit2 is in a range of −2.5V to −2V. In one embodiment, the first initialization signal Vinit1 is −3V, and the second initialization signal Vinit2 is −2.5V.

In other embodiments, the second initialization signal Vinit2 may not be the constant voltage. For example, the second initialization signal Vinit2 includes at least two voltage signals with different values, so as to eliminate the current difference between the second display region and the first display region, to improve the uniformity of the image.

Figure 20:
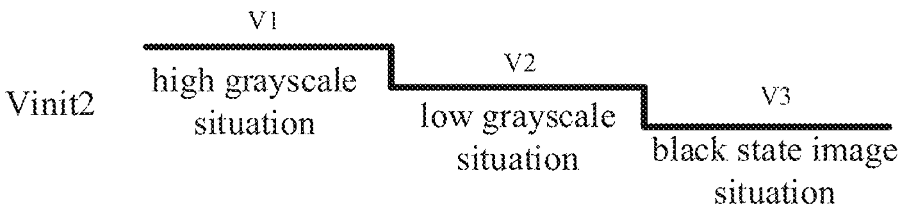
FIG. 20 is a schematic diagram of a second initialization signal in the display panel provided by an embodiment of the present disclosure.

FIG. 20 is a schematic diagram of a second initialization signal in the display panel provided by an embodiment of the present disclosure. For example, the second initialization signal Vinit2 may adopt different voltage signals according to the three situations of high grayscale, low grayscale, and black state image. In some embodiments, the second initialization signal Vinit2 includes three voltage signals with different values. For example, as illustrated in FIG. 20, a voltage signal V1 of a first value corresponds to a case of high grayscale, a voltage signal V2 of a second value corresponds to a case of low grayscale, and a voltage signal V3 of a third value corresponds to a case of black state image. For example, the voltage signal V1 of the first value is greater than the voltage signal V2 of the second value, and the voltage signal V2 of the second value is greater than the voltage signal V3 of the third value. For example, in a grayscale L0-L255, L0 is zero grayscale, which corresponds to the case of black state image. In some embodiments, a boundary value between the low grayscale and the high grayscale may be L60, but is not limited thereto. In the embodiment of the present disclosure, the boundary value between the low grayscale and the high grayscale may be determined according to requirements.

For example, in some embodiments, the voltage signal V1 of the first value is in a range of −2.3V to −2V, the voltage signal V2 of the second value is in a range of −2.5V to −2.3V, and the voltage signal V3 of the third value is in a range of −3V to −2.5V. For example, in some embodiments, the voltage signal V1 of the first value is −2.2V, the voltage signal V2 of the second value is −2.4V, and the voltage signal V3 of the third value is −2.8V. Of course, the second initialization signal Vinit2 may also be divided according to other situations. In some embodiments, the second initialization signal Vinit2 includes at least two voltage signals with different values according to the situation of a black state image and the situation of a non-black state image.

Figure 21:
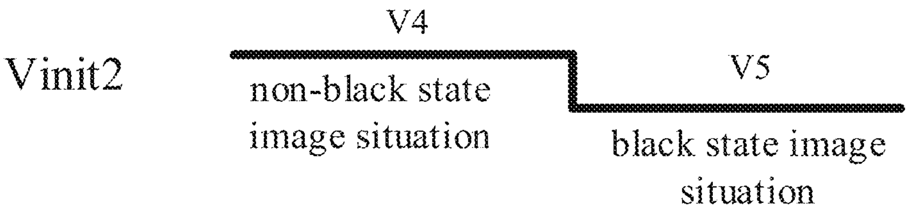
FIG. 21 is a schematic diagram of a second initialization signal in the display panel provided by an embodiment of the present disclosure.

FIG. 21 is a schematic diagram of a second initialization signal in the display panel provided by an embodiment of the present disclosure. For example, as illustrated in FIG. 21, a voltage signal V4 of a fourth value corresponds to the situation of the non-black state image, and a voltage signal V5 of a fifth value corresponds to the situation of the black state image. For example, the voltage signal V4 of the fourth value is greater than the voltage signal V5 of the fifth value. In some embodiments, the voltage signal V4 of the fourth value is in a range of −2.5V to −2V, and the voltage signal V5 of the fifth value is in a range of −3V to −2.5V. For example, in some embodiments, the voltage signal V4 of the fourth value is −2.4 V, and the voltage signal V5 of the fifth value is −2.8 V.

For example, a method for driving the display panel provided by an embodiment of the present disclosure includes: providing the pixel circuit with the first initialization signal Vinit1 through the first signal bus line; and providing the pixel circuit with the second initialization signal Vinit2 through the second signal bus line; the second initialization signal Vinit2 is greater than the first initialization signal Vinit1 to improve the uniformity of the display image.

For example, in the above driving method, the second initialization signal Vinit2 can be divided according to the image display situation. For the specific division situation, reference may be made to the previous description, which will not be repeated here.

For example, in the embodiment of the present disclosure, the turn-on voltage refers to a voltage that can cause a first electrode and a second electrode of a corresponding transistor to be turned on, and the turn-off voltage refers to a voltage that can cause a first electrode and a second electrode of a corresponding transistor to be turned off. In the case where the transistor is a transistor of P-type, the turn-on voltage is a low voltage (e.g., 0 V), and the turn-off voltage is a high voltage (e.g., 5 V); in the case where the transistor is a transistor of N-type, the turn-on voltage is a high voltage (e.g., 5 V), and the turn-off voltage is a low voltage (e.g., 0 V). Driving waveforms illustrated in FIG. 19 are all described by taking transistors of P-type as an example, that is, the turn-on voltage is a low voltage (e.g., 0 V), and the turn-off voltage is a high voltage (e.g., 5 V).

Referring to FIG. 5, FIG. 7 and FIG. 19 together, in the first reset phase t1, the light-emitting control signal EM is the turn-off voltage, the reset control signal RESET is the turn-on voltage, and the scan signal SCAN is the turn-off voltage. At this time, the first reset transistor T6 is in a turn-on state, and the data writing transistor T2, the threshold compensation transistor T3, the first light-emitting control transistor T4, and the second light-emitting control transistor T5 are in a turn-off state. A first initialization signal (an initialization voltage) Vint1 is transmitted to the gate electrode of the driving transistor T1 by the first reset transistor T6 and then is stored by the storage capacitor C1st , so as to reset the driving transistor T1 and eliminate the data stored during emitting light in the last time (a previous frame).

In the data writing and threshold compensation as well as the second reset phase t2, the light-emitting control signal EM is the turn-off voltage, the reset control signal RESET is the turn-off voltage, and the scan signal SCAN is the turn-on voltage. At this time, the data writing transistor T2 and the threshold compensation transistor T3 are in the turn-on state, the second reset transistor T7 is in the turn-on state. For the second pixel unit 102, the second reset transistor T7 of the second pixel unit 102 transmits the second initialization signal Vinit2 to the first electrode of the second light-emitting element 40 to reset the second light-emitting element 40. For the first pixel unit 101, the second reset transistor T7 of the first pixel unit 101 transmits the first initialization signal Vinit1 to the first electrode of the first light-emitting element 30 to reset the first light-emitting element 30. The first light-emitting control transistor T4, the second light-emitting control transistor T5, and the first reset transistor T6 are in the turn-off state. At this time, the data writing transistor T2 transmits the data voltage VDATA to the first electrode of the driving transistor T1, that is, the data writing transistor T2 receives the scan signal SCAN and the data signal DATA and writes the data signal DATA to the first electrode of the driving transistor T1 according to the scan signal SCAN. The threshold compensation transistor T3 is turned on to connect the driving transistor T1 into a diode structure, thereby charging the gate electrode of the driving transistor T1. After the charging is completed, the voltage on the gate electrode of the driving transistor T1 is VDATA+Vth, where VDATA is the data voltage and Vth is the threshold voltage of the driving transistor T1, that is, the threshold compensation transistor T3 receives the scan signal SCAN and performs threshold voltage compensation on the gate electrode of the driving transistor T1 according to the scan signal SCAN. During this phase, a voltage difference between both ends of the storage capacitor Cst is ELVDD-VDATA-Vth.

In the light-emitting phase t3, the light-emitting control signal EM is the turn-on voltage, the reset control signal RESET is the turn-off voltage, and the scan signal SCAN is the turn-off voltage. The first light-emitting control transistor T4 and the second light-emitting control transistor T5 are in the turn-on state, while the data writing transistor T2, the threshold compensation transistor T3, the first reset transistor T6, and the second reset transistor T7 are in the turn-off state. The first voltage signal ELVDD is transmitted to the first electrode of the driving transistor T1 through the first light-emitting control transistor T4, the voltage on the gate electrode of the driving transistor T1 is maintained at VDATA+Vth, and the light-emitting current I flows into the light-emitting element **100*b* through the first light-emitting control transistor T4, the driving transistor T1, and the second light-emitting control transistor T5, so that the light-emitting element 100*b* emits light. That is, the first light-emitting control transistor T4 and the second light-emitting control transistor T5 receive the light-emitting control signal EM, and control the light-emitting element 100*b*** to emit light according to the light-emitting control signal EM. The light-emitting current I satisfies the following saturation current formula:

$$K(Vgs - Vth)^2 = K(VDATA + Vth - ELVDD - Vth)^2 = K(VDATA - ELVDD)^2$$

Among them, $$K = 0.5\mu_n Cox\frac{W}{L},$$

$\mu_n$ is the channel mobility of the driving transistor, Cox is the channel capacitance per unit area of the driving transistor T1, W and L are the channel width and channel length of the driving transistor T1, respectively, and Vgs is the voltage difference between the gate electrode and the source electrode (that is, the first electrode of the driving transistor T1 in this embodiment) of the driving transistor T1.

It can be seen from the above formula that the current flowing through the light-emitting element **100*b*** is independent of the threshold voltage of the driving transistor T1. Therefore, the pixel circuit compensates the threshold voltage of the driving transistor T1 very well.

For example, a ratio of duration of the light-emitting phase t3 to a display time period of one frame may be adjusted. In this way, light-emitting brightness may be controlled by adjusting the ratio of the duration of the light-emitting phase t3 to the display time period of one frame. For example, the ratio of the duration of the light-emitting phase t3 to the display time period of one frame is adjusted by controlling the scan driving circuit 103 in the display panel or a driving circuit additionally provided.

At least one embodiment of the present disclosure provides a display device including any one of the above-mentioned display panels.

Figure 22:
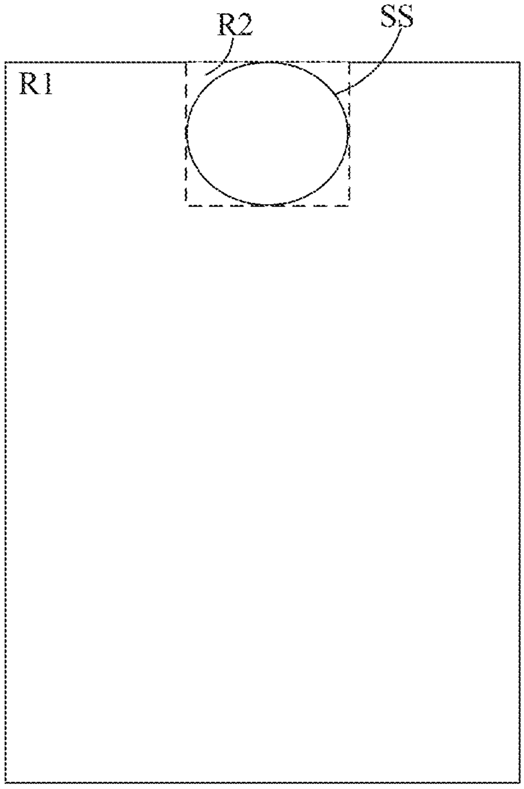
FIG. 22 and FIG. 23 are schematic diagram of a display device provided by an embodiment of the present disclosure.
Figure 23:
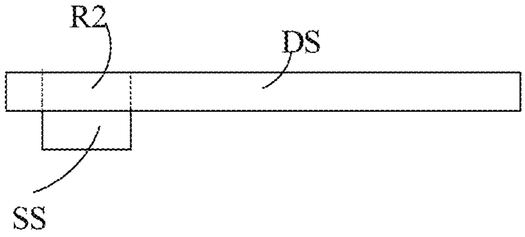

FIG. 22 and FIG. 23 are schematic diagrams of a display device provided by an embodiment of the disclosure. As illustrated in FIG. 22 and FIG. 23, a sensor SS is located on one side of a display panel DS and located in a second display region R2. Ambient light propagates through the second display region R2 and can be sensed by the sensor SS. As illustrated in FIG. 23, the side of the display panel where the sensor SS is not provided is a display side, and can display images. For example, the sensor SS includes a photosensitive sensor, and the photosensitive sensor is disposed at one side of the display panel. In this type of display panel, the hardware such as a photosensitive sensor (for example, a camera) can be located in the light-transmitting display region. Because there is no need to punch holes, it is beneficial to achieving a true full screen.

For example, the second display region R2 may be a rectangle, and an area of an orthographic projection of the sensor SS on the base substrate BS may be less than or equal to an area of an inscribed circle of the second display region R2. That is, a size of the region where the sensor SS is disposed may be smaller than or equal to a size of the inscribed circle of the second display region R2. For example, the size of the region where the sensor SS is disposed is equal to the size of the inscribed circle of the second display region R2, that is, a shape of the region where the sensor SS is disposed may be a circle. Of course, in some embodiments, the second display region R2 may also be other shapes than the rectangle, such as a circle or an ellipse.

For example, the display device is a full-screen display device with an under-screen camera. For example, the display device includes products or components with display function including the above-mentioned display panel, such as a TV, a digital camera, a mobile phone, a watch, a tablet computer, a laptop computer, a navigator, and the like.

For example, the embodiments of the present disclosure are not limited to the specific pixel circuit illustrated in FIG. 5 and FIG. 7, and other pixel circuits that can realize compensation for the driving transistor may be adopted. Based on the description and teaching of the implementation manner in the present disclosure, other arranging manners that a person of ordinary skill in the art can easily think of without any creative work fall within the protection scope of the present disclosure.

The above description takes the 7T1C pixel circuit as an example, and the embodiments of the present disclosure include but are not limited to this. It should be noted that the embodiments of the present disclosure do not limit the number of thin film transistors and the number of capacitors included in the pixel circuit. For example, in some other embodiments, the pixel circuit of the display panel may also be a structure including other numbers of transistors, such as a 7T2C structure, a 6T1C structure, a 6T2C structure, or a 9T2C structure, which is not limited in the embodiments of the present disclosure. Of course, the display panel may further include pixel circuits with less than 7 transistors.

In the embodiments of the present disclosure, the elements located in the same layer can be formed from the same film layer by the same patterning process. For example, the elements located in the same layer may be located on the surface of the same element facing away from the base substrate.

It should be noted that, for the sake of clarity, in the drawings used to describe the embodiments of the present disclosure, the thickness of a layer or region is enlarged. It can be understood that when an element such as a layer, film, region, or substrate is referred to as being "on" or "under" another element, the element can be "directly" "on" or "under" the other element, or there may be an intermediate element.

In the embodiments of the present disclosure, the patterning or patterning process may only include a photolithography process, or include a photolithography process and an etching process, or may include other processes for forming predetermined patterns such as printing process and inkjet process. The photolithography process refers to the process including film formation, exposure, development, etc., using photoresist, mask, exposure machine, etc. to form patterns. The corresponding patterning process can be selected according to the structure formed in the embodiment of the present disclosure.

In the case of no conflict, the features in the same embodiment or in different embodiments of the present disclosure can be combined with each other.

The above are only specific embodiments of the present disclosure, but the protection scope of the present disclosure is not limited thereto. Any person skilled in the art can easily think of changes or substitutions within the technical scope disclosed in the present disclosure. It should be covered within the protection scope of the present disclosure. Therefore, the protection scope of the present disclosure should be subject to the protection scope of the claims.

What is claimed is:

1. A display panel, comprising:

a base substrate, comprising a display region, the display region comprising a first display region and a second display region, the first display region being located on at least one side of the second display region;

a pixel unit, located on the base substrate, comprising a pixel circuit and a light-emitting element, the pixel circuit being configured to drive the light-emitting element, the pixel circuit comprising a driving transistor, a first reset transistor, and a second reset transistor, the first reset transistor being connected with a gate electrode of the driving transistor and being configured to reset the gate electrode of the driving transistor, the second reset transistor being connected with a first electrode of the light-emitting element and configured to reset the first electrode of the light-emitting element; the pixel unit comprising a first pixel unit and a second pixel unit, the pixel circuit of the first pixel unit being located in the first display region, and at least partially overlapping with the light-emitting element of the first pixel unit, the light-emitting element of the second pixel unit being located in the second display region, the pixel circuit of the second pixel unit being located outside the second display region, the pixel circuit of the second pixel unit being connected with the light-emitting element of the second pixel unit through a conductive line;

a first initialization signal line, connected with a first electrode of the first reset transistor in the first pixel unit;

a second initialization signal line, connected with a first electrode of the second reset transistor in the first pixel unit;

a third initialization signal line, connected with a first electrode of the first reset transistor in the second pixel unit;

a fourth initialization signal line, connected with a first electrode of the second reset transistor in the second pixel unit;

a first signal bus line, configured to supply a first initialization signal, the first initialization signal line, the second initialization signal line, and the third initialization signal line being connected with the first signal bus line, respectively;

a second signal bus line, configured to supply a second initialization signal and connected with the fourth initialization signal line, wherein the first signal bus line and the second signal bus line are insulated from each other, so as to be configured to input different initialization signals.

2. The display panel according to claim 1, wherein an orthographic projection of the pixel circuit of the second pixel unit on the base substrate do not overlap with an orthographic projection of the light-emitting element of the second pixel unit on the base substrate.

3. The display panel according to claim 1, wherein the base substrate further comprises a peripheral region, the peripheral region is located on at least one side of the display region, and the peripheral region is a non-display region, and the pixel circuit of the second pixel unit is located in the peripheral region.

4. The display panel according to claim 3, wherein at least a part of the first signal bus line and at least a part of the second signal bus line are both located in the peripheral region.

5. The display panel according to claim 1, wherein the second initialization signal is greater than the first initialization signal.

6. The display panel according to claim 1, further comprising an integrated circuit, wherein the first signal bus line and the second signal bus line are connected with different pins of the integrated circuit, respectively.

7. The display panel according to claim 1, wherein the first signal bus line is closer to the display region than the second signal bus line.

8. The display panel according to claim 1, further comprising a power supply line, wherein the power supply line is configured to supply a constant voltage signal to the pixel circuit, the power supply line is connected with a second electrode of the light-emitting element, and at least a part of the second signal bus line is located between the power supply line and the display region.

9. The display panel according to claim 8, wherein at least a part of the first signal bus line is located between the power supply line and the display region.

10. The display panel according to claim 8, further comprising a control circuit, wherein the control circuit is located between the power supply line and the display region, the first signal bus line and the second signal bus line are located between the control circuit and the display region.

11. The display panel according to claim 8, further comprising a control circuit, wherein the control circuit is located between the power supply line and the display region, and the first signal bus line is located between the control circuit and the display region, and the second signal bus line is located between the control circuit and the power supply line.

12. The display panel according to claim 11, wherein an orthographic projection of the second signal bus line on the base substrate at least partially overlaps with an orthographic projection of the control circuit on the base substrate.

13. The display panel according to claim 11, wherein an orthographic projection of the second signal bus line on the base substrate at least partially overlaps with an orthographic projection of the power supply line on the base substrate.

14. The display panel according to claim 1, wherein the second signal bus line comprises two sub-lines that are located in a first conductive layer and a second conductive layer, respectively, and are connected through a via hole.

15. The display panel according to claim 1, wherein the first signal bus line comprises two sub-lines that are located in a third conductive layer and a fourth conductive layer, respectively, and are connected through a via hole.

16. The display panel according to claim 1, wherein a width of the first signal bus line is greater than a width of the second signal bus line.

17. The display panel according to claim 1, wherein the second signal bus line is configured to supply the second initialization signal, and the second initialization signal comprises at least two voltage signals with different values.

18. A display device, comprising the display panel according to claim 1.

19. The display device according to claim 18, further comprising a photosensitive sensor, wherein the photosensitive sensor is located on one side of the display panel.

* * * * *